United States Patent
Choi et al.

(10) Patent No.: US 9,429,266 B2
(45) Date of Patent: Aug. 30, 2016

(54) BRAKE MECHANISM OF ROBOT USING MULTI-OUTPUT DIFFERENTIAL GEAR

(71) Applicant: Research & Business Foundation SUNGKYUNKWAN UNIVERSITY, Suwon-si (KR)

(72) Inventors: Hyouk Ryeol Choi, Gunpo-si (KR); Hyungpil Moon, Seongnam-si (KR); Jachoon Koo, Seoul (KR); Homoon Kim, Bucheon-si (KR); Jung Seok Suh, Suwon-si (KR); Yun Seok Choi, Seoul (KR)

(73) Assignee: RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 36 days.

(21) Appl. No.: 14/554,499

(22) Filed: Nov. 26, 2014

(65) Prior Publication Data

US 2015/0152992 A1 Jun. 4, 2015

(30) Foreign Application Priority Data

Nov. 26, 2013 (KR) .......................... 10-2013-0144560
Dec. 27, 2013 (KR) .......................... 10-2013-0165596

(51) Int. Cl.
*F16L 55/32* (2006.01)
*F16H 48/11* (2012.01)
(Continued)

(52) U.S. Cl.
CPC ................ *F16L 55/32* (2013.01); *B60T 1/065* (2013.01); *B60T 13/746* (2013.01); *F16H 48/11* (2013.01); *F16H 48/42* (2013.01); *F16D 2121/24* (2013.01); *F16D 2125/50* (2013.01)

(58) Field of Classification Search
CPC .......... F16L 55/32; F16H 48/11; F16H 48/42
See application file for complete search history.

(56) References Cited

U.S. PATENT DOCUMENTS

| 4,722,246 A | 2/1988 | Gaus et al. | |
| 5,083,986 A * | 1/1992 | Teraoka ............. | B60K 17/3462 192/35 |
| 6,698,565 B2 * | 3/2004 | Cool ...................... | F16H 48/08 180/248 |

(Continued)

FOREIGN PATENT DOCUMENTS

| JP | 62-167958 A | 7/1987 |
| KR | 10-0784932 B1 | 12/2007 |
| KR | 10-2011-0073701 A | 6/2011 |

OTHER PUBLICATIONS

Suh, J. S. et al. Development of Multi-out Differential Gear Using Planetary Gear. *Proc of Spring Conference Journal 2012*, Korea Precision Engineering, Sungkyunkwan University. (6 Pages with translation).
Korean Office Action issued in counterpart Korean Application No. 10-2013-0144560 on Jun. 25, 2014 (4 Pages in Korean).

*Primary Examiner* — Sherry Estremsky

(57) ABSTRACT

A brake mechanism of a robot using a multi-output differential gear, capable of selectively blocking or applying driving force as needed, the brake mechanism including, a differential gear unit receiving driving force and generating at least three outputs differentiated from the driving force while being linked with the driving force, a driving unit transferring the driving force to the differential gear unit and moving in a direction away from or approaching the differential gear unit to thereby be detachably provided in the differential gear unit, and a rescuing unit controlling a spaced distance between the driving unit and the differential gear unit to attach and detach the driving unit to and from the differential gear unit.

16 Claims, 16 Drawing Sheets

(51) Int. Cl.
  *F16H 48/42* (2012.01)
  *B60T 1/06* (2006.01)
  *B60T 13/74* (2006.01)
  *F16D 121/24* (2012.01)
  *F16D 125/50* (2012.01)

(56) References Cited

U.S. PATENT DOCUMENTS 9,057,474 B2 * 6/2015 Choi ................. F16H 48/10
2013/0337962 A1 12/2013 Choi et al.

* cited by examiner

130

BRAKE MECHANISM OF ROBOT USING MULTI-OUTPUT DIFFERENTIAL GEAR

CROSS-REFERENCE TO RELATED APPLICATION

This application claims the benefit of priority under 35 U.S.C. §119(a) of Korean Patent Application No. 10-2013-0144560 filed on Nov. 26, 2013 and Korean Patent Application No. 10-2013-0165596 filed on Dec. 27, 2013, with the Korean Intellectual Property Office, the disclosures of which are incorporated herein by reference.

FIELD

The present invention relates to a brake mechanism of a robot using a multi-output differential gear, and more particularly, to a brake mechanism of a robot using a multi-output differential gear, capable of forcibly blocking driving force transferred from the multi-output differential gear.

BACKGROUND

Piping installations, industrial infrastructures, may be distributed all over the country like blood vessels in a human body, and be established as supply routes for various energy resources. However, such piping installations are mostly buried in the underground, and thus, when corrosion occurs in an inside wall of a pipe by the elapse of time and the inside wall is broken due to impacts of external environmental conditions; it may be difficult to inspect and replace the broken component.

Thus, piping installations are continuously being deteriorated, and various defects occurring in this process may cause various pipe-related accidents every year. However, due to insufficient supplies of manpower and technological methods, it difficult to conduct regular, systematic inspections on the piping installations.

In this regard, robots capable of inspecting the inside of the pipe have been developed, and currently, research thereon has been variously conducted. However, the related art robots needs to be equipped with a driving unit (an actuator) for every wheel to separately adjust the movement state of each wheel according to the shape of the pipe, thereby leading to an increase in the size of the robots.

As a result, attention to robots capable of adjusting the speed of each movement unit according the shape of the pipe using only one driving unit has been increasing.

Further, research into methods allowing a robot capable of inspecting the inside of a pipe to a point thereof required by a user or apparatuses of blocking power from being transferred and collecting the power when the robot abnormally moves has been ongoing.

SUMMARY

Therefore, an aspect of exemplary embodiments of the present invention is to provide a brake mechanism of a robot using a multi-output differential gear, capable of blocking or applying driving force to a differential gear unit as needed, by controlling a spaced distance between a driving unit and the differential gear unit.

In addition, an aspect of exemplary embodiments of the present invention is to provide a brake mechanism of a robot using a multi-output differential gear, capable of interrupting movements of the robot by forcibly blocking driving force transferred from the multi-output differential gear.

According to an embodiment of the present invention, there is provided a brake mechanism of a robot, using a multi-output differential gear, the brake mechanism including: a differential gear unit receiving driving force and generating at least three outputs differentiated from the driving force while being linked with the driving force; a driving unit transferring the driving force to the differential gear unit and moving in a direction away from or approaching the differential gear unit to thereby be detachably provided in the differential gear unit; and a rescuing unit controlling a spaced distance between the driving unit and the differential gear unit to attach and detach the driving unit to and from the differential gear unit.

The differential gear unit may include: a driving transferring part rotating by receiving the driving force from the driving unit; a first differential gear part disposed on one surface of the driving transferring part and including a first output gear generating a first output having a rotational speed different from that of the driving transferring part when external resistance is applied to the first output gear and an intermediate gear linked with the first output gear to generate an intermediate output; and a second differential gear part receiving the intermediate output from the first differential gear part and including a second output gear generating a second output having a rotational speed different from that of the intermediate output when external resistance is applied to the second output gear and a third output gear linked with the second output gear and generating a third output having a rotational speed different from that of the second output.

The driving unit may have a sliding gear on a rotational axis thereof, and the driving transferring part may include a plurality of connection gears arranged on a virtual circle centered on the rotational axis, the sliding gear being detachably provided between the connection gears according to movements of the driving unit.

The rescuing unit may include: a frame part extended from an outer surface of the driving unit in a radial direction of the rotational axis; and an axial member passing through the frame part and connected to the sliding gear, wherein a spaced distance between the driving transferring part and the driving unit is controlled by applying a load to the axial member.

The rescuing unit may further include: a handle part provided on an end portion of the axial member adjacent to the frame part and preventing the axial member from being separated from the frame part during the applying of the load to the axial member.

The rescuing unit may further include: an elastic member provided on an end portion of the axial member adjacent to the sliding gear and applying elastic force to the axial member The break mechanism may further include: a plurality of moving units respectively linked with the outputs generated by the first output gear, the second output gear, and the third output gear, receiving external resistance, and transferring the external resistance to at least one of the first output gear, the second output gear and the third output gear.

The break mechanism may further include: an interval adjusting unit controlling a spaced distance between the moving units and the differential gear unit so as to maintain a state of contact between the moving units and a movement surface.

The interval adjusting unit may include: a sliding element disposed on an outer surface of the driving unit and movably provided in a length direction of the driving unit; a first connection member extended from the sliding element and connected to one of the pair of moving units; and a second connection member extended from the sliding element and connected to the other of the pair of moving units, the first connection member and the second connection member allowing the pair of moving units to move in a direction approaching or away from each other according to the movement of the sliding element.

The first differential gear part may include: a plurality of output gears generating a plurality of outputs respectively having a rotational speed different from that of the driving force provided from the driving transferring part when external resistance is applied.

According to another embodiment of the present invention, there is provided a brake mechanism of a robot, using a multi-output differential gear, the brake mechanism including: a driving unit; a differential gear unit receiving driving force and generating at least three outputs differentiated from the driving force while being linked with the driving force when external resistance is applied; an output transferring unit connected to the differential gear unit and linked with the respective outputs generated by the differential gear unit; and a braking unit provided in a state of contact or non-contact with one end of the output transferring unit to interrupt or allow for the movement of the output transferring unit.

The differential gear unit may include: a driving transferring part rotating by receiving the driving force from the driving unit; a first differential gear part disposed on one surface of the driving transferring part and including a first output gear generating a first output having a rotational speed different from that of the driving transferring part when external resistance is applied to the first output gear and an intermediate gear linked with the first output gear to generate an intermediate output; and a second differential gear part receiving the intermediate output from the first differential gear part and including a second output gear generating a second output having a rotational speed different from that of the intermediate output when external resistance is applied to the second output gear and a third output gear linked with the second output gear and generating a third output having a rotational speed different from that of the second output.

Sawtooth portions may be formed on an outer circumferential surface of the first output gear, the output transferring unit may include a first output transferring part including a first transfer gear engaged with the first output gear, a first axial member extended from the first transfer gear in a direction of a central axis of the first transfer gear, and a first brake gear provided on the first axial member and linked with the braking unit, and the braking unit may include a first locking member movably provided in a direction approaching or away from the one end of the output transferring unit to selectively contact the one end of the output transferring unit; a driving motor allowing for movements of the first locking member; and a link part connecting the first locking member and the driving motor to each other.

Sawtooth portions may be formed on a surface of the first locking member opposed to the first brake gear, the sawtooth portions being engaged with the braking unit.

The braking unit may further include: a second locking member opposed to the first locking member with the first brake gear interposed between the locking members, and having sawtooth portions formed on a surface thereof opposed to the first locking member, the second locking member approaching or being apart from the first locking member while being linked with the movement of the first locking member.

The first differential gear part may further include: a plurality of output gears generating a plurality of outputs respectively having a rotational speed different from that of the driving force when external resistance is applied.

DETAILED DESCRIPTION

Figure 1:
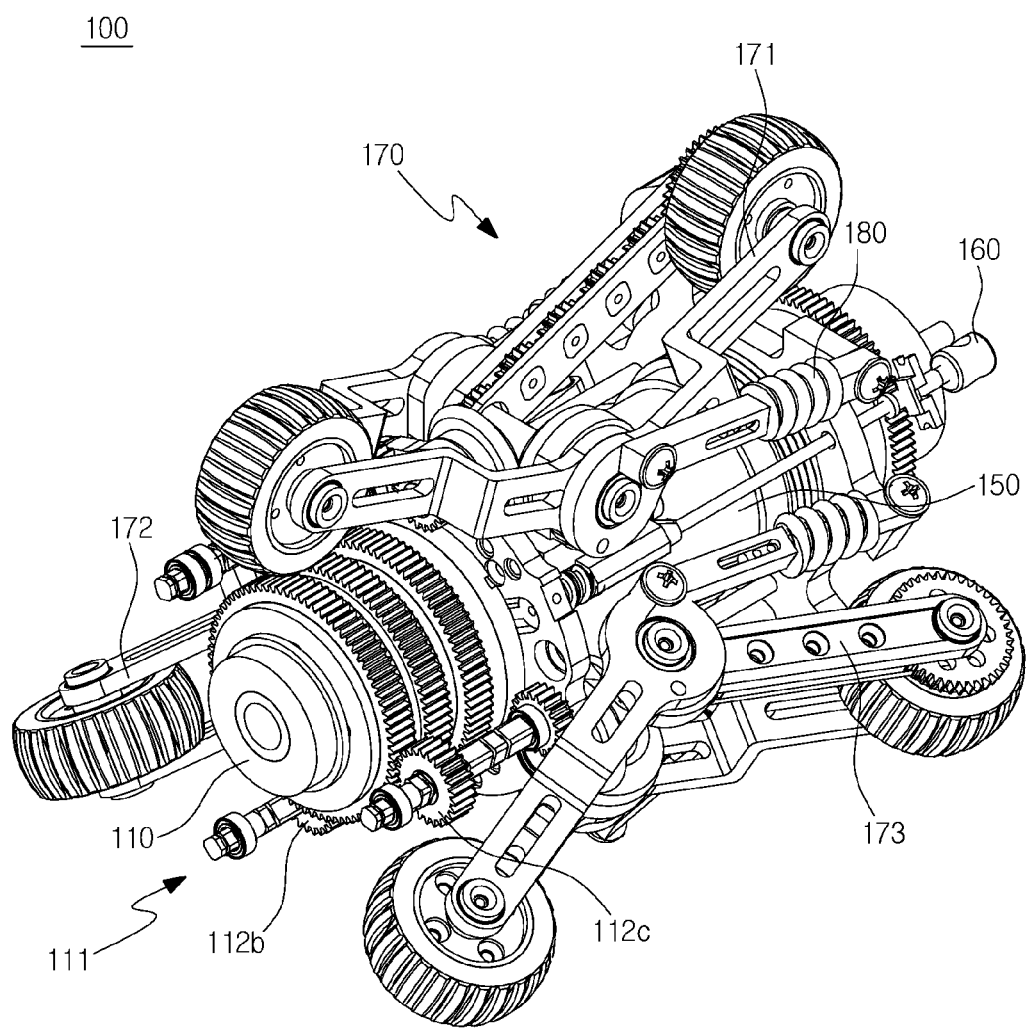
FIG. 1 is a perspective view schematically illustrating a brake mechanism of a robot using a multi-output differential gear according to a first exemplary embodiment of the present invention.

Exemplary embodiments of the present disclosure will now be described in detail with reference to the accompanying drawings. The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In various exemplary embodiments, the same reference numerals will be used throughout to designate the same or like elements, and a configuration of elements will be representatively described in a first exemplary embodiment and other configurations different from those of the first exemplary embodiment will be described in further exemplary embodiments.

Hereinafter, a brake mechanism of a robot using a multi-output differential gear according to a first exemplary embodiment of the present invention will be described in detail.

For convenience of explanation, the following description is made on the assumption that a robot using a multi-output differential gear is an in-pipe robot moving along an inside wall of a pipe.

However, a robot according to exemplary embodiments of the present invention is not limited to the in-pipe robot, and examples thereof may include a robot capable of entering into an internal space to which the access of a human is unfeasible to inspect damage to the space, a robot capable of conveying a certain product to an internal space, a robot capable of repairing the interior of the space, and the like.

Figure 2:
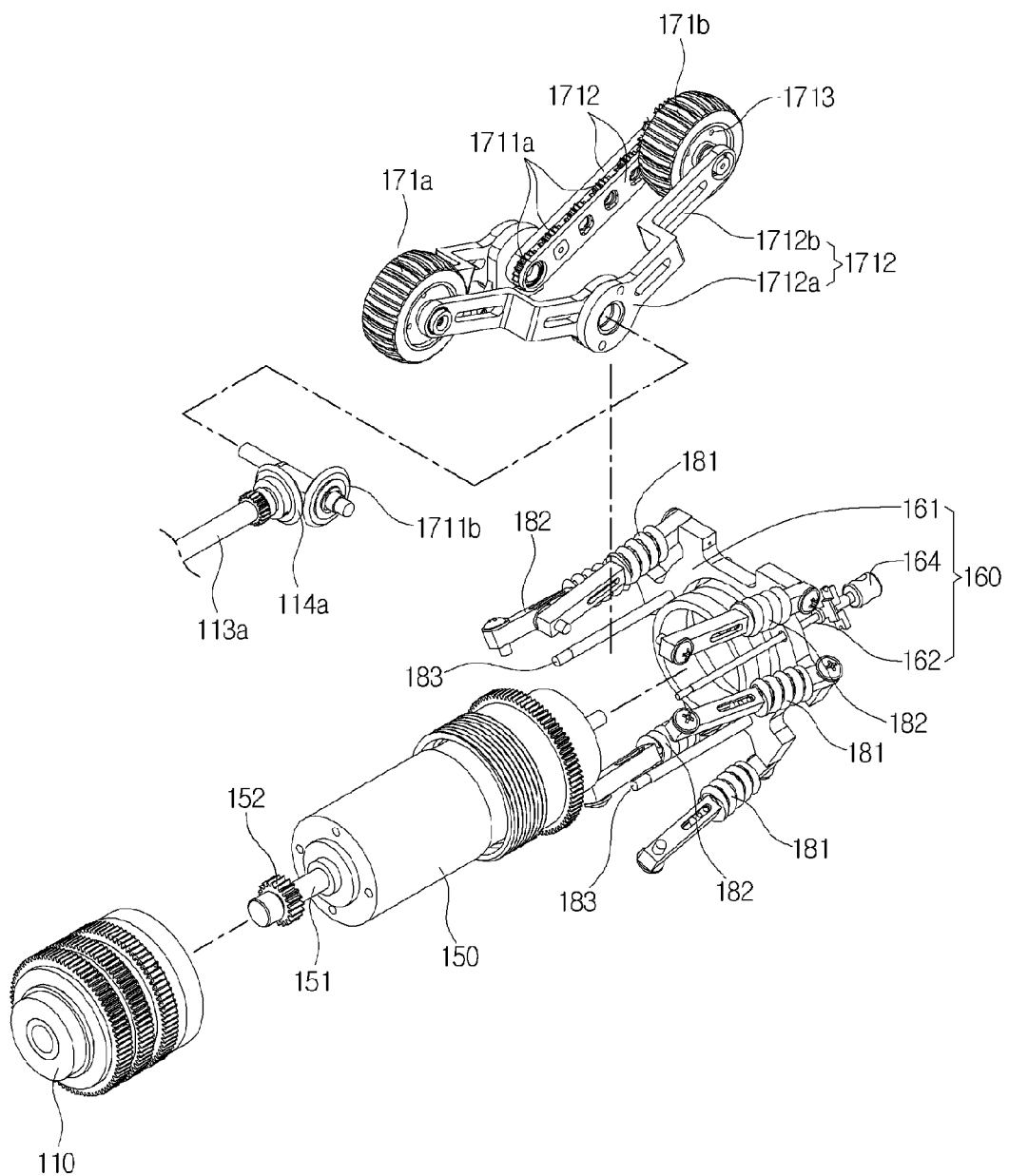
FIG. 2 is an exploded perspective view schematically illustrating the brake mechanism of the robot using the multi-output differential gear illustrated in FIG. 1.

FIG. 1 is a perspective view schematically illustrating a brake mechanism of a robot using a multi-output differential gear according to a first exemplary embodiment of the present invention. FIG. 2 is an exploded perspective view schematically illustrating the brake mechanism of the robot using the multi-output differential gear illustrated in FIG. 1.

Referring to FIG. 1 or 2, a brake mechanism 100 of the robot using the multi-output differential gear according to the first exemplary embodiment of the present invention may include a differential gear unit 110, a driving unit 150, a rescuing unit 160, moving units 170, and an interval adjusting unit 180, and may be configured in such a manner that respective output gears of the differential gear unit 110 may be linked with each other to control speeds thereof according to an internal state of a pipe, thereby allowing for stable driving of the robot and if necessary, driving force applied to the differential gear unit 110 may be blocked.

Figure 3:
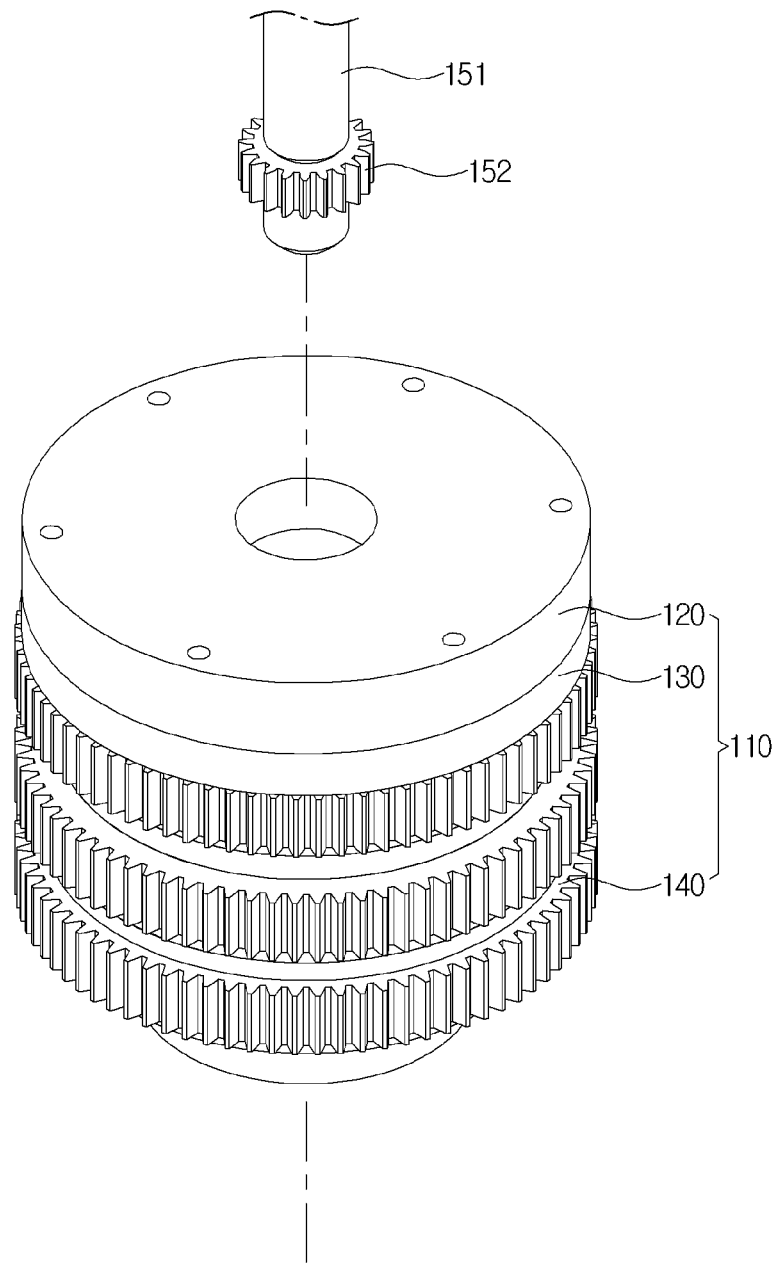
FIG. 3 is a perspective view schematically illustrating a differential gear unit in the brake mechanism of the robot using the multi-output differential gear illustrated in FIG. 1.
Figure 4:
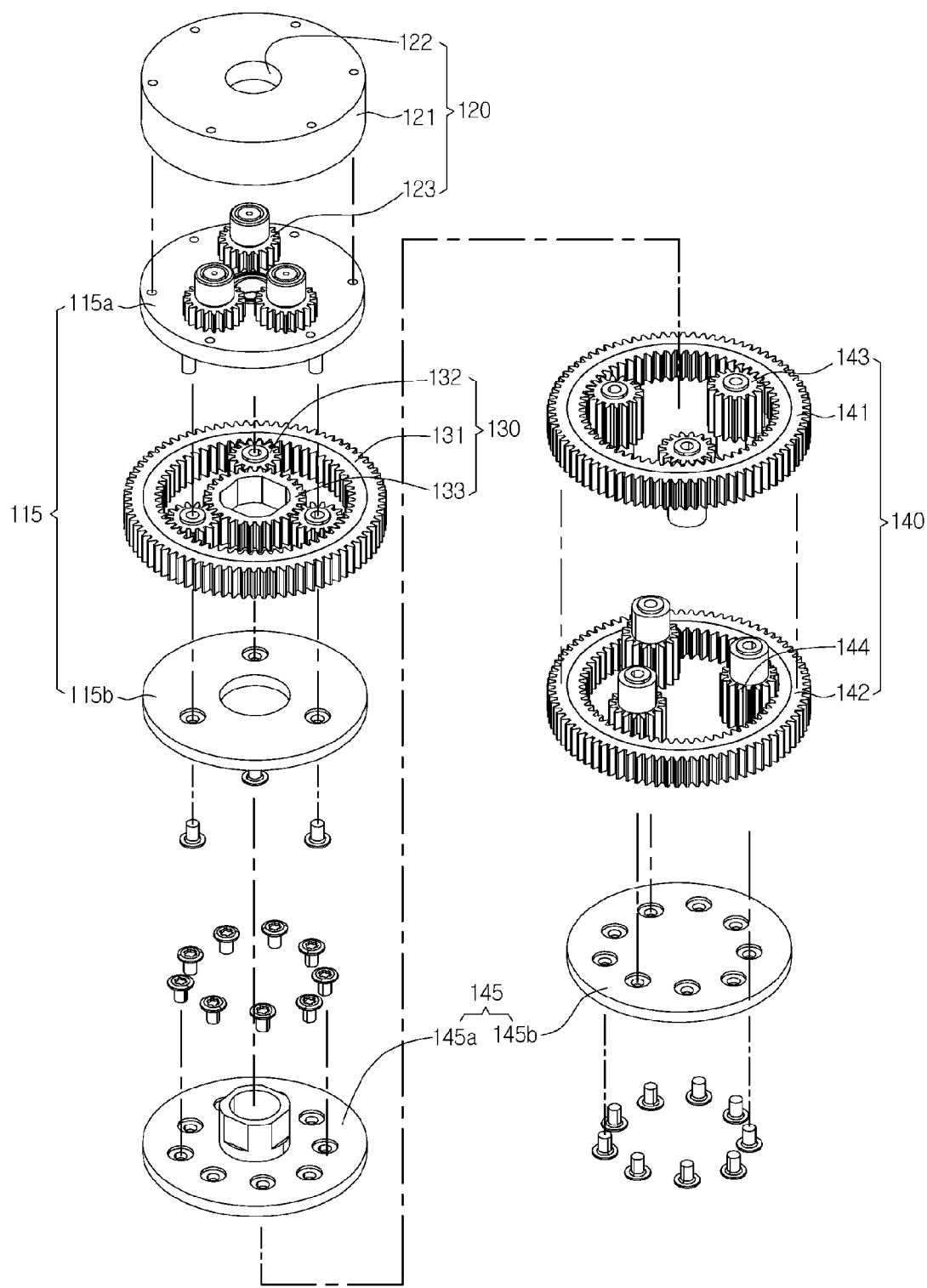
FIG. 4 is an exploded perspective view schematically illustrating the differential gear unit in the brake mechanism of the robot using the multi-output differential gear illustrated in FIG. 1.

FIG. 3 is a perspective view schematically illustrating a differential gear unit in the brake mechanism of the robot using the multi-output differential gear illustrated in FIG. 1. FIG. 4 is an exploded perspective view schematically illustrating the differential gear unit in the brake mechanism of the robot using the multi-output differential gear illustrated in FIG. 1.

Referring to FIG. 3 or 4, the differential gear unit 110 may be configured to receive driving force from the driving unit 150 to be described later, transfer outputs to three output gears, and generate a differential operation by external resistance applied to the moving units 170 to be described later. The differential gear unit 110 may include a driving-force transferring part 120, a first differential gear part 130, and a second differential gear part 140.

In the first exemplary embodiment of the present invention, the first differential gear part 130 and the second differential gear part 140 may have the same central axis 105.

The driving unit 150 to be described later may be detachably provided in the driving-force transferring part 120. When the driving unit 150 is mounted in the driving-force transferring part 120, the driving-force transferring part 120 may receive driving force from the driving unit 150 to transfer the driving force to the first differential gear part 130. When the driving unit 150 is separated from the driving-force transferring part 120, the driving force applied to the first differential gear part 130 may be blocked. The driving-force transferring part 120 may include a housing 121 and connection gears 123.

The housing 121 may perform as a main frame of the driving-force transferring part 120 and have an insertion groove 122 formed in a surface of the housing 121 facing to the driving force 150. A sliding gear 152 of the driving unit 150 may be inserted into or separated from the driving-force transferring part 120 through the insertion groove 122.

The connection gears 123 may be engaged with the sliding gear 152 of the driving unit 150, and depending on whether or not the connection gears 123 are engaged with the sliding gear 152, driving force may be transferred to the first differential gear part 130, or may be blocked.

That is, the connection gears 123 may be accommodated in the interior of the housing 121 and may be arranged on a virtual circle centered on a rotational axis 151 of the driving unit 150. Here, a diameter of the virtual circle on which the connection gears 123 are disposed may be variously set according to a diameter of the sliding gear 152.

The connection gears 123 according to the first exemplary embodiment of the present invention may be installed on a first finishing member 115a to be described later and may rotate together with rotation of the sliding gear 152 to transfer driving force to the first differential gear part 130.

Figure 5:
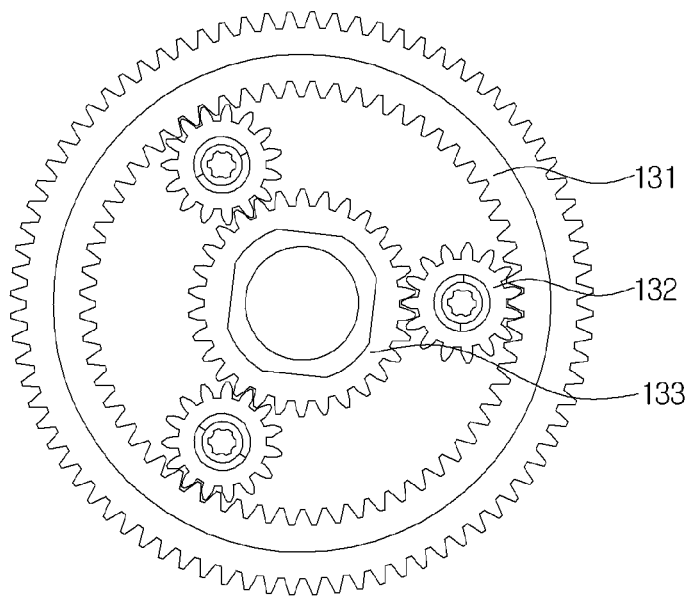
FIG. 5 is a plan view schematically illustrating a first differential gear part in the differential gear unit of FIG. 3.

FIG. 5 is a plan view schematically illustrating a first differential gear part in the differential gear unit of FIG. 3.

Referring to FIG. 5, the first differential gear part 130 may transfer driving force received from the driving-force transferring part 120 to the moving units 170 and at the same time, when external resistance is applied thereto from the moving units 170, the respective gears of the first differential gear part 130 may be linked with each other, generate a first output having a rotational speed different from that of the driving force applied from the driving unit 150, and transfer the first output to the moving units 170. In addition, an intermediate output having a rotational speed lower than that of the driving force may be transferred from an intermediate gear 133 to the second differential gear part 140. The first differential gear part 130 according to the first exemplary embodiment of the present invention may include a first output gear 131, three first epicyclic gears 132, and the intermediate gear 133.

Meanwhile, first finishing members 115 may be mounted on opposing surfaces of the first differential gear part 130 to fix locations of the first output gear 131, the three first epicyclic gears 132, and the intermediate gear 133.

In the first exemplary embodiment of the present invention, the connection gears 123 may be installed on an outer surface of the first finishing member 115a and the housing 121 may be provided to cover outer surfaces of the first finishing members 115 to configure the driving-force transferring part 120.

Meanwhile, the first differential gear part 130 may generate the first output having a rotational speed different from that of the driving force and the intermediate output having a rotational speed lower than that of the driving force, upon receiving external resistance applied from the moving units 170.

Here, a reduction ratio of the rotational speed may be varied depending on a ratio of gears engaged with each other. That is, when a linkage movement is made from the first output gear 131 to the intermediate gear 133, the first output may be transferred to the intermediate gear 133, in an amount corresponding to a ratio of the number of sawtooth portions formed on an inner circumferential surface of the first output gear 131 versus the number of sawtooth portions of the intermediate gear 133 (That is, a ratio of the number of sawtooth portions formed on an inner circumferential surface of the first output gear 131: the number of sawtooth portions of the intermediate gear 133). The formula will be described in detail in an operating method according to the first exemplary embodiment of the present invention to be described later.

The first output gear 131 has sawtooth portions formed on the inner circumferential surface and an outer circumferential surface thereof, and the sawtooth portions of the inner circumferential surface are engaged with the first epicyclic gears 132, and the sawtooth portions of the outer circumferential surface may transfer the first output to a first moving unit 171 to be described later but receive external resistance.

That is, the sawtooth portions of the outer circumferential surface may receive external resistance from the first moving unit 171 and at the same time, transfer the first output having a rotational speed different from that of the driving force to the first moving unit 171, depending on the external resistance.

The three first epicyclic gears 132 may be engaged with the inner circumferential surface of the first output gear 131 and be disposed to form angles of 120 degrees with respect to the central axis 105 of the first differential gear part 130. The first epicyclic gears 132 may transfer the first output generated in consideration of external resistance received from the first output gear 131, to the intermediate gear 133.

However, the number and arrangements of the first epicyclic gears 132 are not limited thereto, and if necessary, may be freely selected.

The intermediate gear 133 may not rotate in the case of no external resistance, and when external resistance is applied thereto, may transfer the intermediate output having a rotational speed reduced as compared to that of the driving force, to the second differential gear part 140.

Re-explaining coupling relationships of the first differential gear part 130, the three first epicyclic gears 132 may be engaged with the inner circumferential surface of the first output gear 131, and the intermediate gear 133 may be disposed inwardly of the first epicyclic gears 132 such that the outer circumferential surface thereof may be engaged with the first epicyclic gears 132.

In other words, the three first epicyclic gears 132 may be engaged with the outer circumferential surface of the intermediate gear 133, and the first output gear 131 may be disposed such that the sawtooth portions formed on the inner circumferential surface thereof are engaged with the first epicyclic gears 132. Here, the first output gear 131 and the intermediate gear 133 may have the same central axis 105.

As described above, according to the first exemplary embodiment of the present invention, the first finishing members 115a and 115b may be formed between the driving unit 150 and the first differential gear part 130 to fix the locations of the first epicyclic gears 132 so as to allow the first epicyclic gears 132 to individually rotate, and may perform a connector of transferring the driving force received from the driving unit 150 to the first epicyclic gears 132.

Figure 6:
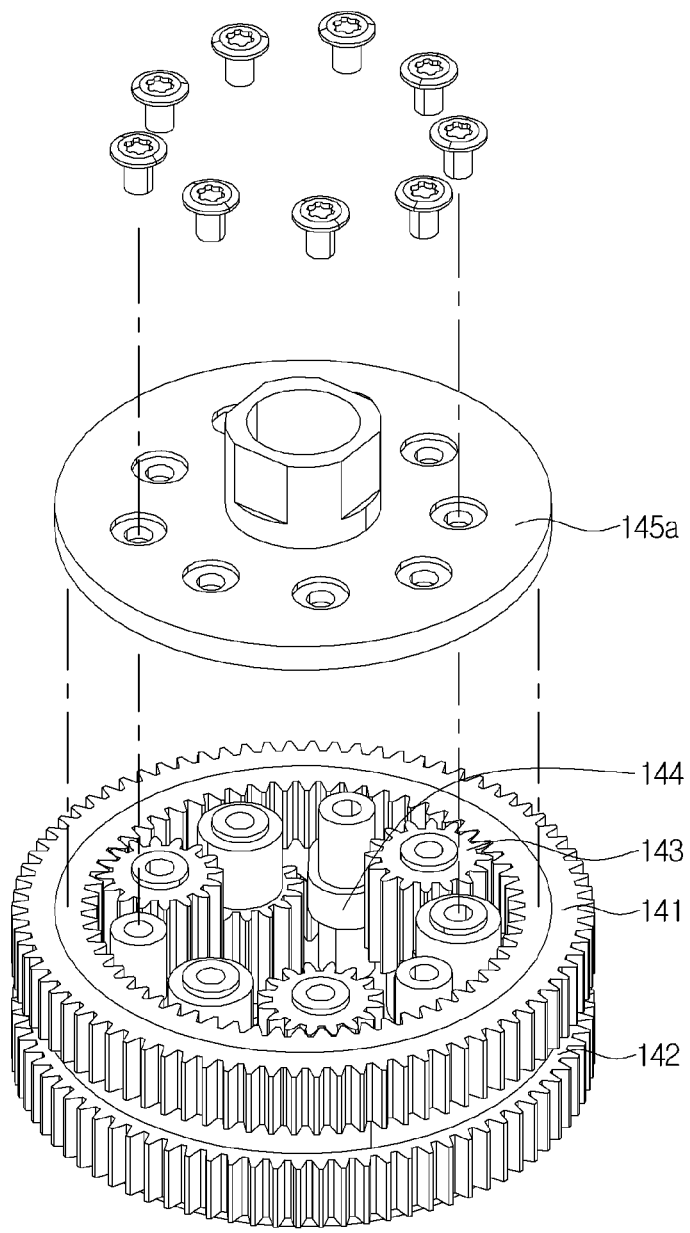
FIG. 6 is an exploded perspective view schematically illustrating a second differential gear part in the differential gear unit of FIG. 3.
Figure 7:
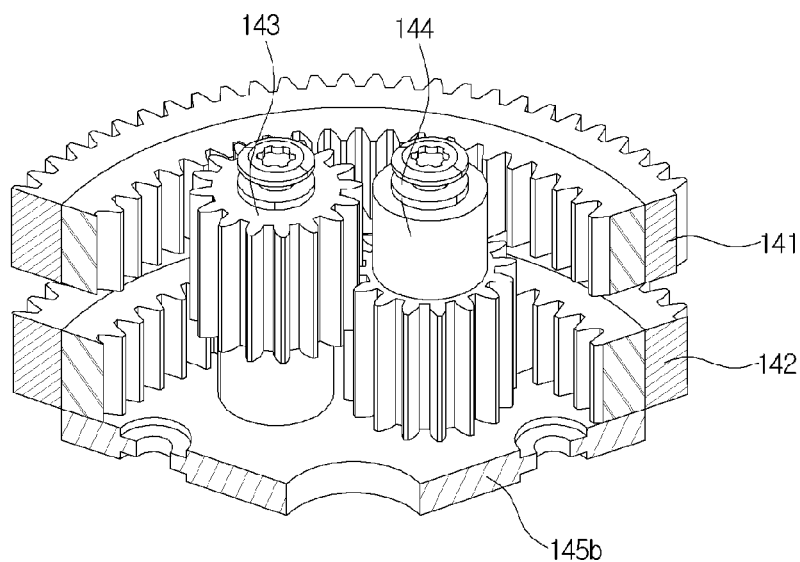
FIG. 7 is a cut-away perspective view schematically illustrating coupling relationships between a second output gear, a third output gear, a second epicycle gear, and a third epicycle gear in the second differential gear part of FIG. 6.
Figure 8:
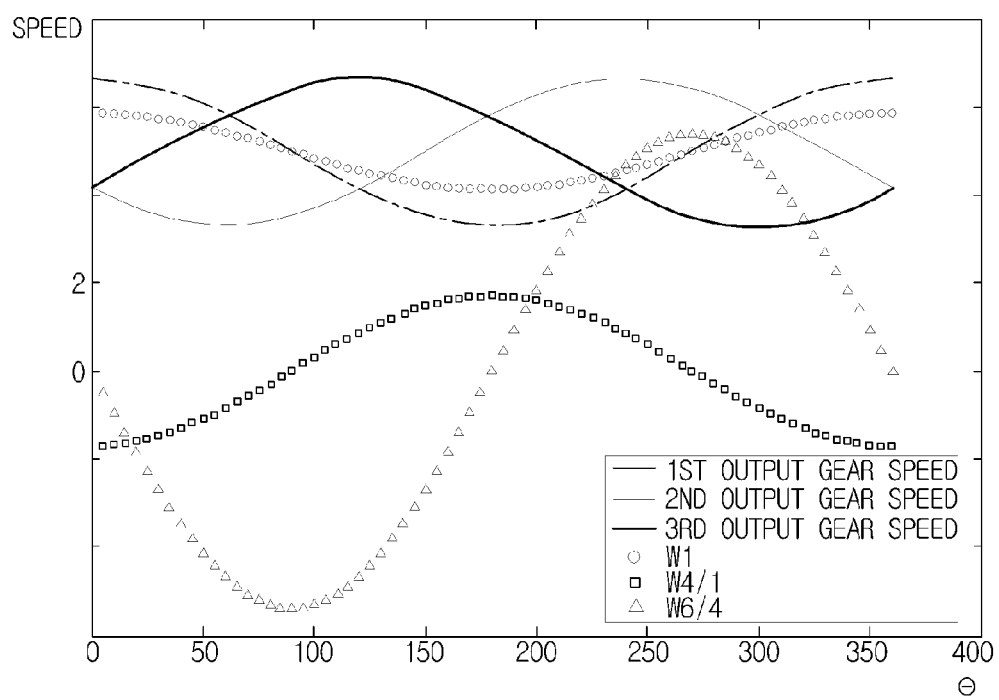
FIG. 8 is a graph schematically illustrating linkage relationships between the respective output gears in the differential gear unit of FIG. 3.

FIG. 6 is an exploded perspective view schematically illustrating a second differential gear part in the differential gear unit of FIG. 3. FIG. 7 is a cut-away perspective view schematically illustrating coupling relationships between a second output gear, a third output gear, a second epicycle gear, and a third epicycle gear in the second differential gear part of FIG. 6. FIG. 8 is a graph schematically illustrating linkage relationships between the respective output gears in the differential gear unit of FIG. 3.

Referring to FIGS. 6 through 8, the second differential gear part 140 may receive the intermediate output from the intermediate gear 133 to generate an output externally through a second output gear 141 and a third output gear 142. When external resistance is applied from the moving units 170 to the second differential gear part 140, gears of the second differential gear part 140 may be linked with each other and generate a second output having a rotational speed different from that of the intermediate output and a third output having a rotational speed different from that of the second output through the second output gear 141 and the third output gear 142.

According to the first exemplary embodiment of the present invention, the second differential gear part 140 may include the second output gear 141, the third output gear 142, second epicycle gears 143 and third epicycle gears 144.

In a case in which external resistance is not applied to a second moving unit 172 or a third moving unit 173 to be described later, each of the second output gear 141 and the third output gear 142 may generate an output the same as the intermediate output. In a case in which external resistance is applied to the second output gear 141 or the third output gear 142, the second output gear 141 may generate a second output having a rotational speed different from that of the intermediate output and the third output gear 142 may be linked with the second output gear 141 and generate a third output differentiated from the second output.

In addition, in the case that the intermediate output is not present, when external resistance is applied to the second output gear 141, the second output gear 141, the second epicycle gears 143 and the third epicycle gears 144 may be linked with each other, and the third output gear 142 may rotate in a direction opposite to a direction of the rotation of the second output gear 141.

The second output gear 141 may have sawtooth portions formed on an inner circumferential surface and an outer circumferential surface thereof. The sawtooth portions of the inner circumferential surface may be engaged with the second epicycle gears 143 and the sawtooth portions of the outer circumferential surface may transfer the second output to the second moving unit 172. That is, the sawtooth portions formed on the outer circumferential surface of the second output gear 141 may receive external resistance from the second moving unit 172 and at the same time, transfer the second output having a rotational speed different from that of the intermediate output to the second moving unit 172, depending on the external resistance.

The third output gear 142 may have sawtooth portions formed on an inner circumferential surface and an outer circumferential surface thereof. The sawtooth portions of the inner circumferential surface may be engaged with the third epicycle gears 144 and the sawtooth portions of the outer circumferential surface may transfer a third output to the third moving unit 173. That is, the sawtooth portions formed on the outer circumferential surface of the third output gear 142 may transfer the third output having a rotational speed different from that of the second output to the third moving unit 173 using external resistance, upon receiving the external resistance from the third moving unit 173.

The second epicycle gears 143 may be engaged with the inner circumferential surface of the second output gear 141 and also be engaged with the respective third epicycle gears 144. The three second epicycle gears 143 may be disposed to form angles of 120 degrees with respect to the central axis 105 of the second differential gear part 140. The second epicycle gears 143 may transfer the external resistance received from the second output gear 141 to the third epicycle gears 144 to be described later.

However, the number and arrangements of the second epicycle gears 143 are not limited thereto, and if necessary, may be freely selected.

The third epicycle gears 144 may be engaged with the inner circumferential surface of the third output gear 142 and also be engaged with the second epicycle gears 143. The three third epicycle gears 144 may be disposed to form angles of 120 degrees with respect to the central axis 105 of the second differential gear part 140. The third epicycle gears 144 may transfer the external resistance received from the third output gear 142 to the second epicycle gears 143.

However, the number and arrangements of the third epicycle gears 144 may preferably be selected to correspond to those of the second epicycle gears 143.

In a case in which external resistances may be applied simultaneously from the second moving unit 172 and the third moving part 173, since the second output gear 141, the third output gear 142, the second epicycle gears 143, and the third epicycle gears 144 configuring the second differential gear part 140 may be linked with one another, external resistance applied from the second moving unit 172 and external resistance applied from the third moving part 173 may be offset from each other or may complement each other, such that it is considered that a single external resistance is applied. Thus, the said case is identical to the case of having external resistance applied from one of the second moving unit 172 or the third moving part 173.

Re-explaining the coupling relationships of the second differential gear part 140 with reference to FIGS. 6 through 8, the sawtooth portions formed on the inner circumferential surface of the second output gear 141 may be engaged with the second epicycle gears 143, and the second epicycle gears 143 may be engaged with the respective third epicycle gears 144 corresponding thereto. In addition, the third epicycle gears 144 may be engaged with sawtooth portions formed on an inner circumferential surface of the third output gear 142.

However, since lower portions of the second epicycle gears 143 may be engaged with upper portions of the third epicycle gears 144, the second epicycle gears and the third output gear 142 may not be directly engaged with each other or the third epicycle gears 144 and the second output gear 141 may not be directly engaged with each other.

Even with the coupling relationships, the second output gear 141 and the third output gear 142 may be preferably disposed not to directly influence each other.

Meanwhile, according to the first exemplary embodiment 100 of the present invention, second finishing members 145a and 145b may be preferably formed to fix locations of the respective gears of the second differential gear part 140 thereto.

The second finishing members 145a and 145b may be connected to the intermediate gear 133 and fix the locations of the second epicycle gears 143 and the third epicycle gears 144 so as to allow the epicycle gears to individually rotate. When the intermediate output is generated, the second finishing members 145a and 145b may transfer the intermediate output to the second epicycle gears 143.

In addition, an output transferring unit 111 may be further provided between the differential gear unit 110 and the driving unit 150, the output transferring unit 111 transferring outputs generated by the output gears 131, 141 and 142 to the moving units 170.

The output transferring unit 111 may include spur gears 112a (not shown), 112b and 112c engaged with the respective output gears 131, 141, and 142, output transferring shafts 113a, 113b and 113c receiving the outputs generated by the output gears 131, 141, and 142 from the spur gears 112a, 112b and 112c, and bevel gears 114a, 114b and 114c connected to the output transferring shifts 113a, 113b and 113c to rotate in the same manner as those of the spur gears 112a, 112b and 112c.

However, the present invention is not limited thereto, any configuration may be included, as long as it may provide a mechanism capable of delivering the outputs generated by the output gears 131, 141 and 142.

The driving unit 150 may move in a direction approaching or away from the differential gear unit 110 and be detachably provided in the driving-force transferring part 120. When the driving unit 150 is mounted in the driving-force transferring part 120, the sliding gear 152 may be provided on the rotational axis 151 to provide driving force to the differential gear unit 110.

The sliding gear 152 may be provided on the rotational axis 151 and rotate together with the rotational axis 151. The sliding gear 152 may be detachably provided between the connection gears 123 according to the movement of the driving unit 150 so as to transfer or block the driving force of the driving unit 150 to the differential gear unit 110.

That is, the driving unit 150 may move in a direction approaching or away from the differential gear unit 110, and through the movement, the sliding gear 152 of the driving unit 150 may be detachably provided between the connection gears 123 to thereby block or transfer the driving force of the driving unit 150 to the differential gear unit 110.

Figure 9:
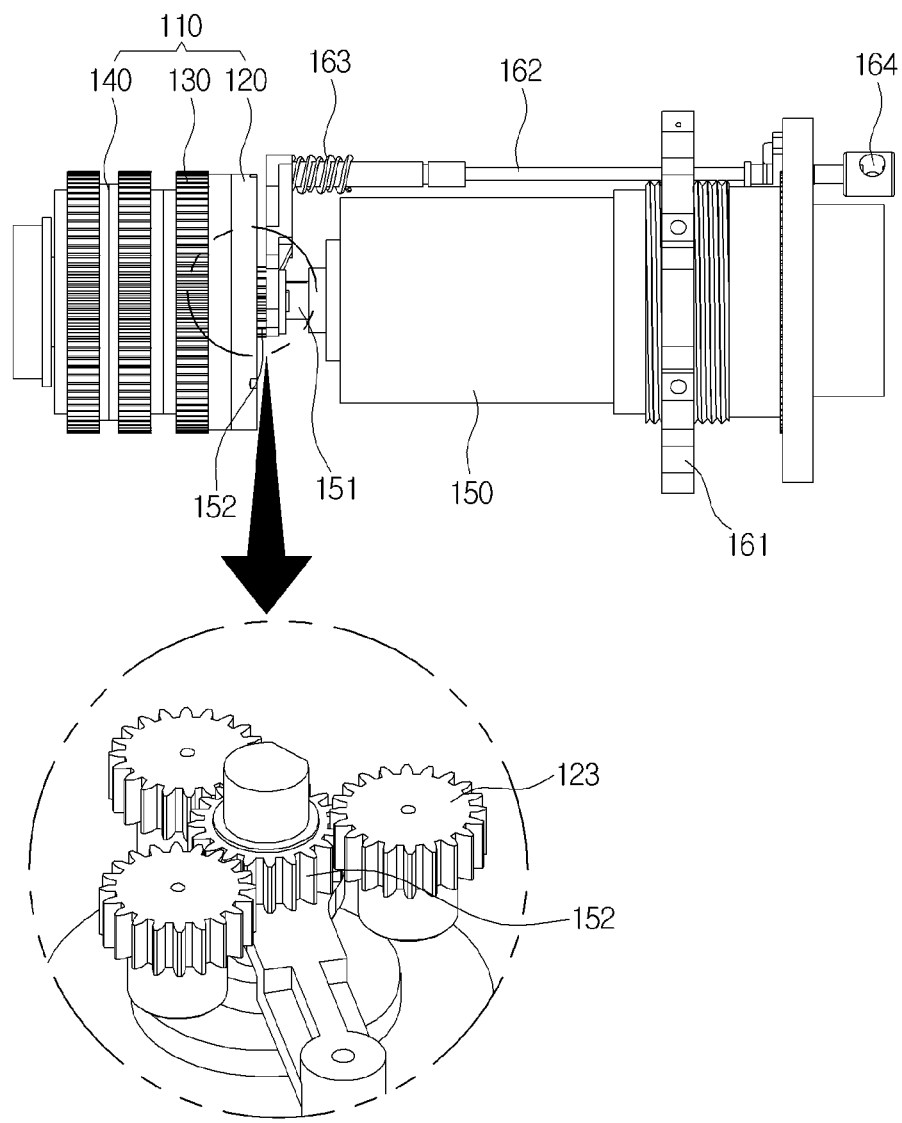
FIG. 9 is a front view schematically illustrating a state of a rescuing unit before the rescuing unit is operated in the brake mechanism of the robot using the multi-output differential gear illustrated in FIG. 1.
Figure 10:
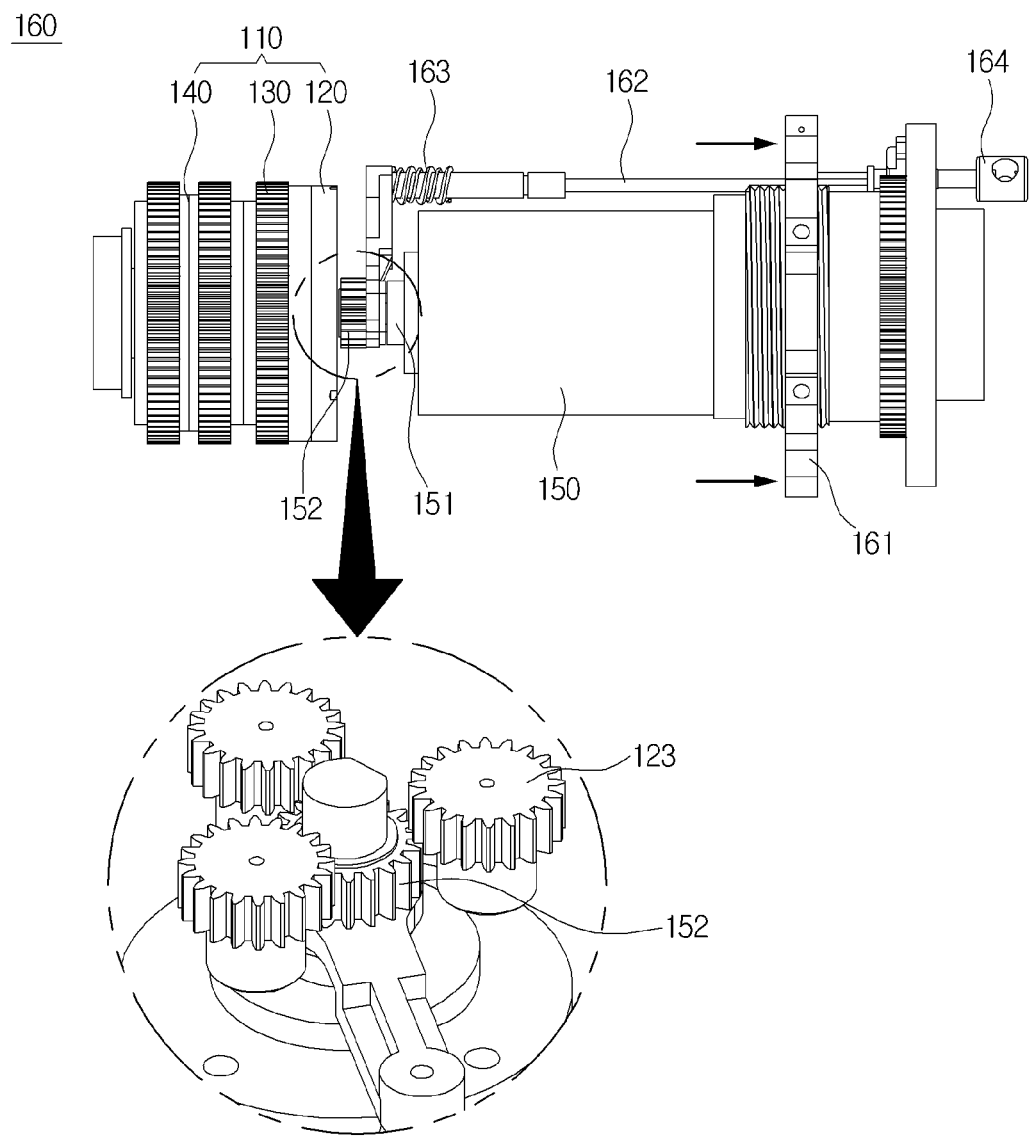
FIG. 10 is a front view schematically illustrating a state of the rescuing unit during the operation of the rescuing unit in the brake mechanism of the robot using the multi-output differential gear illustrated in FIG. 1.

FIG. 9 is a front view schematically illustrating a state of a rescuing unit before the rescuing unit is operated in the brake mechanism of the robot using the multi-output differential gear illustrated in FIG. 1. FIG. 10 is a front view schematically illustrating a state of the rescuing unit during the operation of the rescuing unit in the brake mechanism of the robot using the multi-output differential gear illustrated in FIG. 1.

Referring to FIG. 9 or 10, the rescuing unit 160 may control a spaced distance between the differential gear unit 110 and the driving unit 150 to block or transfer driving force generated by the driving unit 150 to the differential gear unit 110, and may include a frame part 161 and an axial member 162.

The frame part 161, a plate member provided on an outer surface of the driving unit 150 and extending in a radial direction with respect to the central axis 151, may be provided with a groove formed in a direction of the movement of the driving unit 150 so as to guide movements of the axial member 162 to be described later.

In addition, the frame part 161 may simultaneously serve as a main frame of the interval adjusting unit 180 movably provided in a length direction of the driving unit 150 on the outer surface of the driving unit 150 in a state in which a first connection member 181 and a second connection member 182 are installed on the frame part 161 to thereby control a spaced distance between the driving unit 150 and the differential gear unit 110.

The axial member 162 may have one end connected to the sliding gear 152 and be disposed to pass through the frame part 161. The axial member 162 may be pushed or pulled to slide the sliding gear 152 along the rotational axis 151, thereby detachably providing the sliding gear 152 between the connection gears 123.

In the first exemplary embodiment of the present invention, when the axial member 162 is pulled, the sliding gear 152 may be detached from the connection gears 123, such that the transfer of driving force may be blocked. However, the present invention is not limited to such a structure and when the axial member 162 is pushed, the sliding gear 152 may be detached from the connection gears 123, such that the transfer of driving force may be blocked.

Meanwhile, even in the case that the sliding gear 152 may slide on the rotational axis 151 of the driving unit 150, the sliding gear 152 and the rotational axis 151 may rotate together.

Meanwhile, in the first exemplary embodiment of the present invention, an elastic member 163 may be further included on an end portion of the axial member 162 adjacent to the driving-force transferring part 120, and may apply elastic force to the axial member 162 to allow the axial member 162 to return back to an initial state thereof when the axial member 162 is pushed or pulled.

In addition, a handle part 164 may be further included on the other end of the axial member 162 so as to prevent the axial member 162 from being separated from the frame part 161 when the axial member 162 is pushed or pulled.

Here, the handle part 164 may have a width greater than a diameter of the axial member 162 or a length greater than the axial member 162 to prevent the axial member 162 passing through the frame part 161 from being separated from the frame part 161. In addition, the handle part 164 may serve as a handle portion able to facilitate the pulling or pushing of the axial member 162.

Figure 11:
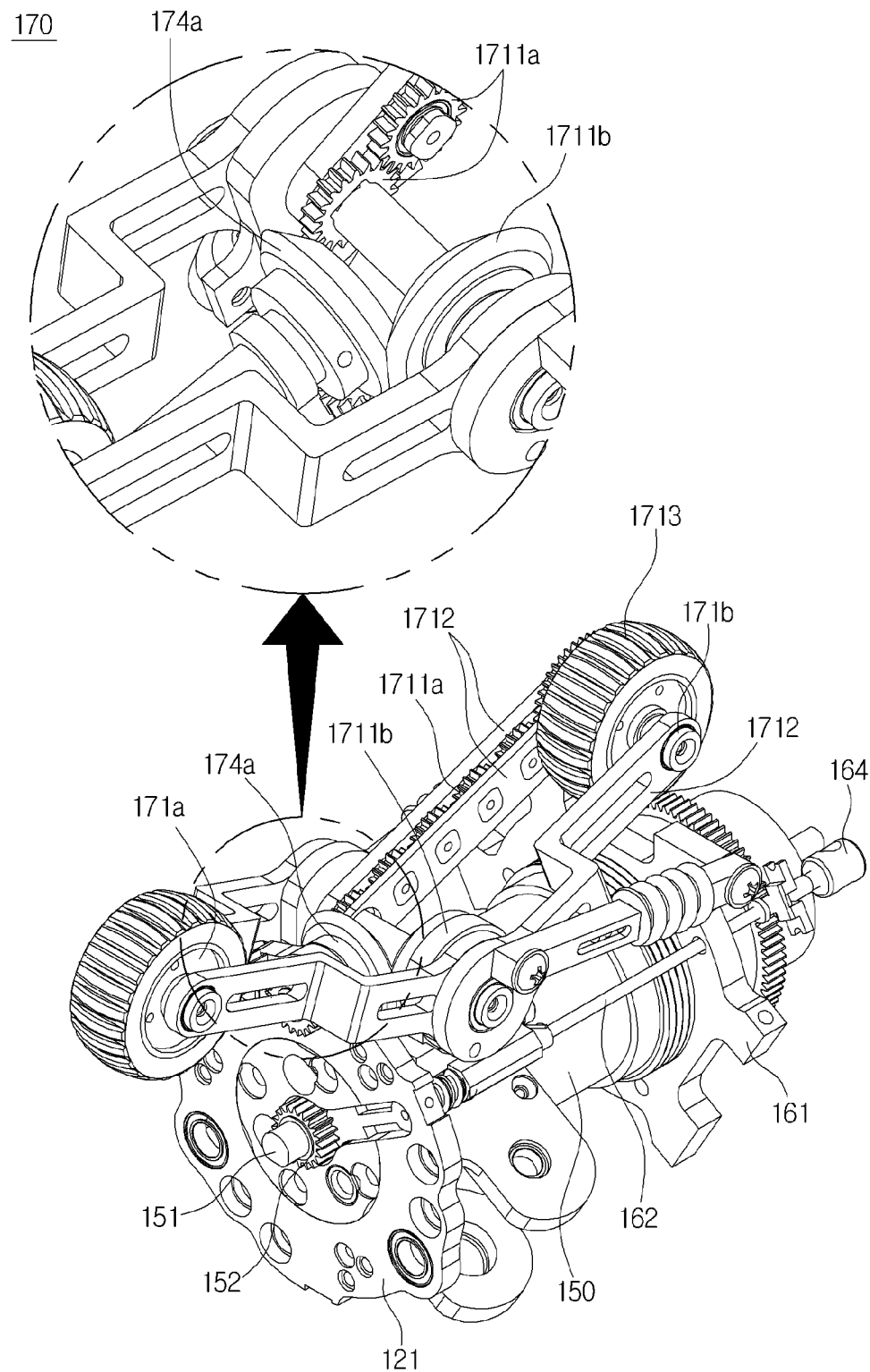
FIG. 11 is a perspective view schematically illustrating moving units in the brake mechanism of the robot using the multi-output differential gear illustrated in FIG. 1.

FIG. 11 is a perspective view schematically illustrating moving units in the brake mechanism of the robot using the multi-output differential gear illustrated in FIG. 1.

Referring to FIG. 11, the moving units 170 may be linked with the output gears and receive the outputs generated by the output gears to perform movements thereof, while receiving external resistance generated during the movements thereof to transfer the external resistance to the respective output gears. The moving units 170 may include the first moving unit 171, the second moving unit 172, and the third moving unit 173.

The first moving unit 171 may receive driving force or the first output from the first output gear 131 to perform the movement thereof and at the same time, may transfer the external resistance to the first output gear 131 in a case in which external resistance factor is generated such as cases in which a rotating section is formed or obstructions are formed in a movement path in the interior of a pipe.

According to the first exemplary embodiment 100 of the present invention, two first moving units 171 are provided as a pair of first moving units 171, and one of the first moving units 171 may be disposed toward a front end portion of the robot while the other of the first moving units 171 may be disposed toward a rear end portion of the robot. Each of the first moving units 171 may include a gear mechanism 1711 engaged with the bevel gear 114a, receiving the first output from the output gear 121, and transferring the first output to a wheel part 1713, the wheel part 1713 moved by receiving the first output from the gear mechanism 1711, and support parts 1712 supporting the wheel part 1713.

The gear mechanism 1711 may be configured to include a plurality of spur gears 1711a and a bevel gear 1711b that are spaced apart from each other and engaged with each other, and one of the spur gears 1711a may have the same axis as that of the bevel gear 1711b and rotate together therewith.

Here, the bevel gear 1711b of the gear mechanism 1711 may be engaged with the bevel gear 114a of the output transferring unit 111 to receive the first output, and the bevel gear 1711b may sequentially transfer power to the plurality of spur gears 1711a and transfer the first output to the wheel part 1713.

The support parts 1712, members supporting the wheel part 1713, may be provided on both opposing surfaces of the wheel part 1713. Here, the support part 1712 installed on one side of the wheel part 1713 may be provided to cover both sides of the spur gears 1711a so as to fix relative locations of the plurality of spur gears 1711a configuring the gear mechanism 1711 thereto.

That is, one of the support parts 1712 may support the wheel part 1713 and fix the relative locations of the plurality of spur gears 1711a.

In addition, the support part 1712 may be classified as a pivoting part 1712a having the same pivot axis as the central axis of the spur gear engaged with the bevel gear 114a among the plurality of spur gears 1711a configuring the gear mechanism 1711, and an extension part 1712b extending from the pivoting part 1712a to the wheel part 1713.

Here, the pivoting part 1712a, a circular member, may be rotatably provided about the pivot axis and control a spaced distance between a pair of first moving units 171, whereby the first moving units 171 may be maintained in a state in which they come into contact with the inside wall of a pipe.

Meanwhile, the extension part 1712b may be a member extending from the pivoting part 1712a to the wheel part 1713 and factors thereof such as a length or the like may be differently set in consideration of an inner diameter of the pipe.

However, such a configuration may be provided as an example of a structure configured to deliver an output from the differential gear unit 110 to the moving units 170 according to the first exemplary embodiment 100 of the present invention. Thus, the present invention is not limited to the configuration as described above.

In addition, since the second moving units 172 and the third moving units 173 may be configured in the same manner as that of the first moving units 171, a detailed description thereof will be omitted. The second moving units 172 may receive the second output and transfer external resistance through the second output gear 141, and the third moving units 173 may receive a third output and transfer external resistance through the third output gear 142.

Meanwhile, re-explaining disposition relationships of the first moving units 171, the second moving units 172 and the third moving units 173 according to the first exemplary embodiment 100 of the present invention, the respective moving units may be disposed to form angles of 120 degrees with respect to the central axis of the differential gear unit 110. The moving units 171a, 172a and 173a disposed on a front surface of the differential gear unit 110 may be arranged on a common concentric circle, and the moving units 171b, 172b and 173b disposed on a rear surface of the differential gear unit 110 may also be arranged on a common concentric circle.

In addition, the concentric circle formed by the moving units 171*a*, 172*a* and 173*a* disposed on the front surface of the differential gear unit 110 may have a diameter the same as that of the concentric circle formed by the moving units 171*b*, 172*b* and 173*b*.

However, the dispositions of the moving units are not limited thereto and may be differentially set according to a user's intention.

Figure 12:
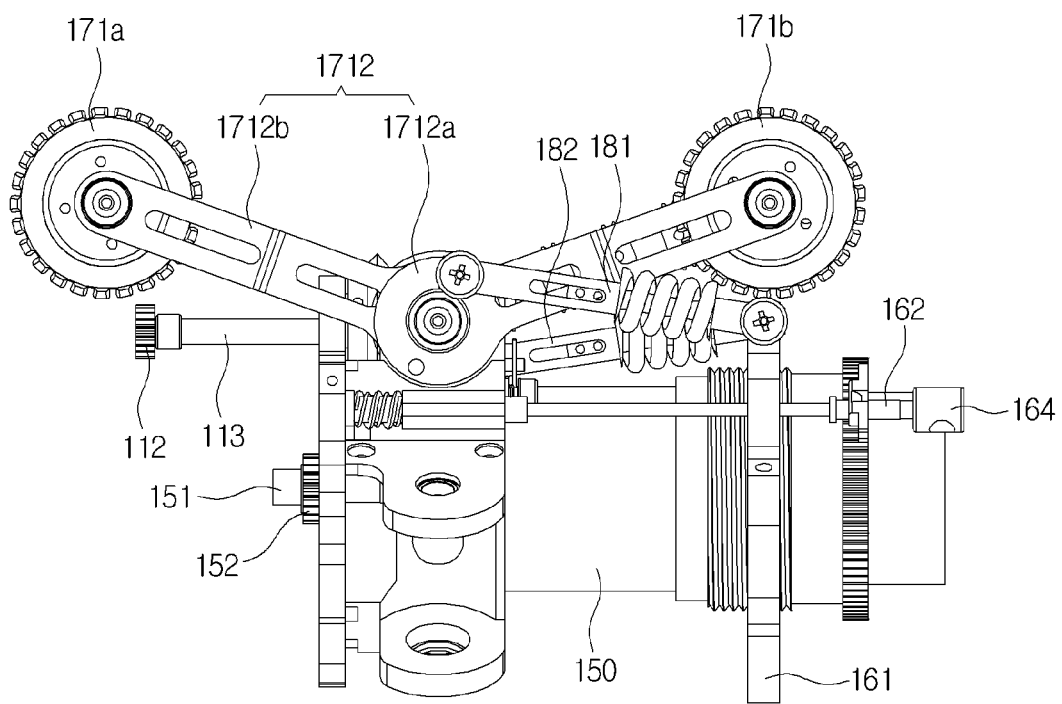
FIG. 12 is a front view schematically illustrating a state in which the moving units of FIG. 11 are spaced apart from each other.
Figure 13:
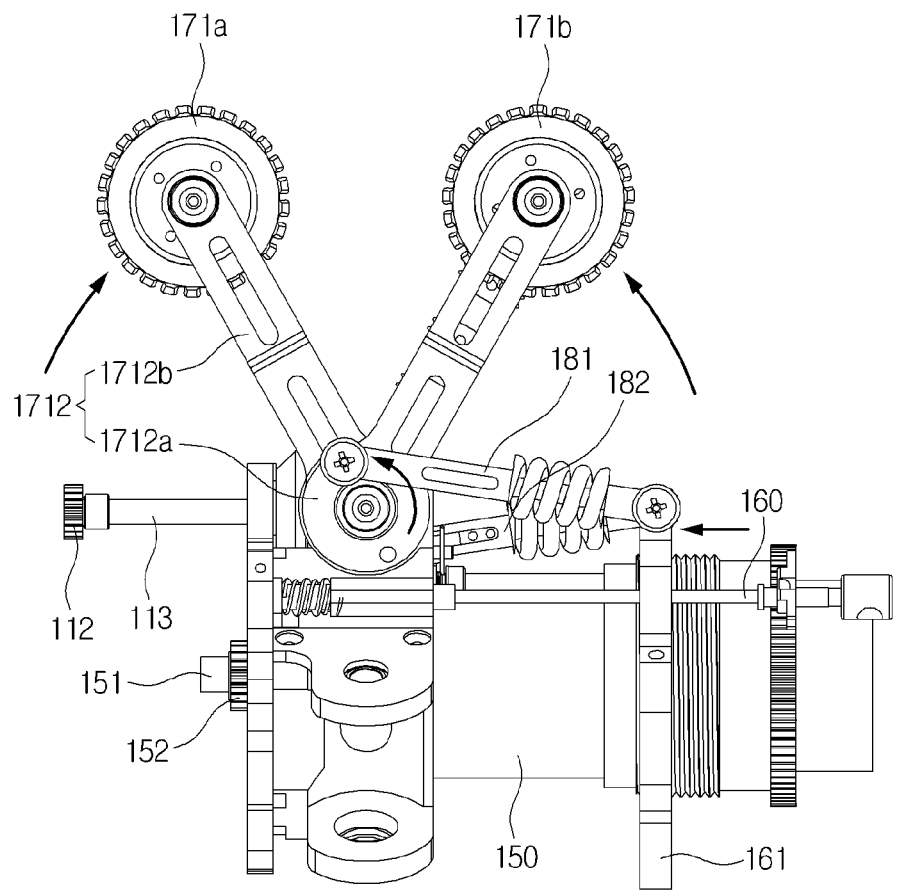
FIG. 13 is a front view schematically illustrating a state in which the moving units of FIG. 12 move in directions in which they approach each other by an interval adjusting unit.

FIG. 12 is a front view schematically illustrating a state in which the moving units of FIG. 11 are spaced apart from each other. FIG. 13 is a front view schematically illustrating a state in which the moving units of FIG. 12 move in directions in which they approach each other by an interval adjusting unit.

The interval adjusting unit 180 may be connected to the pivoting part 1712*a* of the support part 1712 and may pivot the pivoting part 1712*a* to control the spaced distance between the moving units 170 and the differential gear unit 110. The interval adjusting unit 180 may include the first connection member 181 and the second connection member 182.

Here, a case in which the first connection member 181 and the second connection member 182 are connected to the first moving units 171 is described, and the first connection member 181 and the second connection member 182 may be applied to the second moving units 172 and the third moving units 173 in substantially the same manner as that of the first moving units 171.

The first connection member 181 may have one end connected to the frame part 161 and the other end connected to a lower end portion of the pivoting part 1712*a* of the support part 1712 finishing the gear mechanism 1711.

The second connection member 182 may have one end connected to the frame part 161 and the other end connected to an upper end portion of a pivoting part 1712*a* of a support part 1712' opposed to the support part 1712 to which the first connection member 181 is connected.

Here, when the frame part 161 moves in a direction away from the differential gear unit 110, the first connection member 181 may rotate the support part 1712 in a counter-clockwise direction, and the second connection member 182 may rotate the support part 1712' in a clockwise direction, whereby a spaced distance between the pair of the first moving units 171 may be reduced.

Conversely, when the frame part 161 moves in a direction approaching the differential gear unit 110, the first connection member 181 may rotate the support part 1712 in a clockwise direction, and the second connection member 182 may rotate the support part 1712' in a counterclockwise direction, whereby the spaced distance between the pair of the first moving units 171 may be increased.

That is, the interval adjusting unit 180 according to the first exemplary embodiment of the present invention may freely control the spaced distance between the pair of the first moving units 171 through the movement of a single frame part 161 to provide easiness and convenience of operations.

Meanwhile, unlike the first exemplary embodiment of the present invention, the first connection member 181 and the second connection member 182 may not be connected to the frame part 161 but may be installed on a sliding element (not shown), a separate constitution.

The sliding element (not shown) may be movably provided in the length direction of the driving unit 150 on the outer surface of the driving unit 150. Here, a screw thread may be formed on the outer surface of the driving unit 150 and another screw thread corresponding to the screw thread of the driving unit 150 may be provided on an inside wall of the sliding member (not shown). However, the present invention is not limited thereto.

Meanwhile, the movements of the second and third moving units 172 and 173 may be controlled by the interval adjusting unit 180 in the same manner as that of the first moving units 171.

Further, according to the first exemplary embodiment of the present invention, a plurality of guiding units 184 may be provided in a circumferential direction of the driving unit 150 to guide the frame part 161 in the movement direction thereof.

In order to simultaneously control the spaced distance between the first moving units 171, a spaced distance between the second moving units 172, and a spaced distance between the third moving units 173 using a single frame part 161, the frame part 161 may need to maintain a state thereof in parallel with an initial state thereof and may need to move in a direction far away from or approaching the differential gear unit 110.

To this end, the plurality of guiding units 184 penetrating through the frame part 161 and disposed to be perpendicular with respect to the frame part 161 may be installed, whereby the movement direction of the frame part 161 may be easily controlled.

Hereinafter, operations of the brake mechanism of the robot using the multi-output differential gear according to the first exemplary embodiment of the present invention as described above will be described.

First, in the brake mechanism of the robot using the multi-output differential gear according to the first exemplary embodiment of the present invention, operations of the differential gear unit 110 receiving driving force and external resistance to perform a differential operation and transferring differential outputs to the respective moving units will be described.

First, an operation of the driving-force transferring part 120 will be explained. Only in a case in which the sliding gear 152 is installed between the connection gears 123 of the driving-force transferring part 120, the driving force of the driving unit 150 may be transferred to the differential gear unit 110. In a case in which the sliding gear 152 is separated from the connection gears 123, the transfer of driving force from the driving unit 150 may be blocked.

Here, whether or not the sliding gear 152 is installed between the connection gears 123 may be determined by an operation of the rescuing unit 160. When the handle part 164 of the rescuing unit 160 is directly pulled by a user or is drawn through an automatic driving scheme, the driving unit 150 may move away from the differential gear unit 110.

In this case, the sliding gear 152 provided on the rotational axis 151 of the driving unit 150 may be separated from the connection gears 123, simultaneously with the driving unit 150, and in this case, the driving force of the driving unit 150 may not be transferred to the differential gear unit 110. The said case may be defined as "a driving force cut-off state"

The "driving force cut-off state" may be provided in a case in which an operation of the robot in a moving state needs to be stopped, for example, in a case in which the robot moving through the interior of a pipe may be caught by obstacles and may not be movable, or in a case in which the robot arrives at a target point in the interior of the pipe and thus, it is necessary to be removed from the pipe.

However, in the "driving force cut-off state", since the driving force may not be transferred to the first differential gear part 130, an operation of the first differential gear part 130 will be explained on the assumption that the sliding gear 152 is installed between the connection gears 123, that is, "a driving force transfer state" is provided.

Here, since the driving-force transferring part 120 may merely transfer the driving force received from the driving unit 150 and does not increase or attenuate a magnitude of the driving force, the driving-force transferring part 120 may deliver driving force having the same magnitude as that of the driving force received from the driving unit 150 to the first differential gear part 130.

A case in which the driving force is received from the driving-force transferring part 120 and at the same time, external resistance is not applied from the first moving units 171 to the first output gear 131 will be described as follows. The driving force received from the driving-force transferring part 120 may be delivered to the first epicyclic gears 132, and the first epicyclic gears 132 may rotate while being engaged with the outer circumferential surface of the intermediate gear 133 to thereby allow the first output gear 131 to rotate in a direction of the rotation of the driving unit 150. In this case, the rotational speed may be varied depending on a ratio of a sawtooth number of the first epicyclic gears 132 versus a sawtooth number of the first output gear 131 (That is, a ratio of a sawtooth number of the first epicyclic gears 132: a sawtooth number of the first output gear 131).

In this case, since the intermediate gear 133 is in a stationary state, a value of the intermediate output may be "0" and the second differential gear part 140 may be in a stationary state when external resistance is not applied thereto.

When external resistance is applied to the first output gear 131, the first output gear 131 may generate a first output having a rotational speed different from that of external power by using the external resistance, the gears of the first differential gear part 130 may be linked with each other, and the intermediate gear 133 may generate an intermediate output. Accordingly, the intermediate gear 133 may perform a differential function for external power.

Meanwhile, an operating method of the second differential gear part 140 will be described. When a value of the intermediate output transferred to the second differential gear part 140 is "0", a second output and a third output generated by the second output gear 141 and the third output gear 142 may be affected depending on whether or not the external resistance is applied to the gear. In a case in which external resistance is not applied, since the intermediate output may not be transferred to the second differential gear part 140 as described above, all of the second output and the third output may not be generated. Meanwhile, in a case in which external resistance is applied to the second output gear 141 or the third output gear 142, the second output gear 141 and the third output gear 142 may rotate together to thereby generate the second output and the third output, respectively.

Here, when the intermediate output is applied to the second differential gear part 140 and external resistance is applied to the second output gear 141, the second output gear 141 may generate a second output having a rotational speed different from that of the intermediate output, and the third output gear 142 linked with the second output gear 141 may generate a third output having a rotational speed different from that of the second output.

Conversely, in a case in which external resistance is applied to the third output gear 142, an operation may be performed in the same manner as that of a case in which external resistance is applied to the second output gear. When external resistances are applied to both the second output gear 141 and the third output gear 142, the external resistances may be offset from each other and may complement each other, such that it is considered that a single external resistance is applied and thus, the operation as described above may be performed. That is, all of the second output gear 141 and the third output gear 142 may perform a differential function.

The first output gear 131, the second output gear 141, and the third output gear 142 may have rotational speeds varied according to sawtooth numbers of the gears linked with one another, but may rotate in the same direction. In a case in which three output gears need to rotate at the same rotational speed in the same direction, relative speeds of the gears within the first differential gear part 130 may be 0. In a case in which the three output gears need to rotate at different rotational speeds, that is, in a case in which the output gears perform a differential function, the relative speeds of the respective output gears may be varied, which will be explained by the following formula:

$$\begin{bmatrix} \omega_1 \\ \omega_{4/1} \\ \omega_{6/4} \end{bmatrix} = \begin{bmatrix} 1 & \left(\frac{n_3}{n_2}\right)\left(-\frac{n_4}{n_3}\right) & 0 \\ 1 & 1 & \frac{n_6}{n_5} \\ 1 & 1 & -\left(\frac{n_7}{n_8}\right) \end{bmatrix}^{-1} \begin{bmatrix} \omega_2 \\ \omega_5 \\ \omega_8 \end{bmatrix} \quad \text{[Formula]}$$

Where, $\omega_1$ indicates a rotational speed of driving force applied from the driving unit 150, $\omega_2$ is a rotational speed of the first output gear 131, $\omega_5$ is a rotational speed of the second output gear 141, $\omega_8$ is a rotational speed of the third output gear 142, $\omega_{4/1}$ is a relative speed of the intermediate gear 133 with respect to the driving force, and $\omega_{6/4}$ is a relative speed of the second epicyclic gear 143 with respect to the intermediate gear 133. In addition, $n_3$ indicates the number of sawtooth portions of the first epicyclic gear 132, $n_2$ indicates the number of sawtooth portions of the first output gear 131, and $n_4$ indicates the number of sawtooth portions of the intermediate gear 133. Furthermore, $n_6$ indicates the number of sawtooth portions of the second epicyclic gear 143, $n_5$ indicates the number of sawtooth portions of the second output gear 141, $n_7$ indicates the number of sawtooth portions of the third epicyclic gear 144, and $n_8$ indicates the number of sawtooth portions of the third output gear 142.

First, the rotational speed ($\omega_2$) of the first output gear, the rotational speed ($\omega_5$) of the second output gear, and the rotational speed ($\omega_8$) of the third output gear are denoted by solid lines. The rotational speed ($\omega_1$) of external driving power, the relative speed ($\omega_{4/1}$) of the intermediate gear with respect to the external driving force, and the relative speed ($\omega_{6/4}$) of the second epicyclic gear with respect to the intermediate gear are denoted by dots at respective moments of time, the dots being connected to one another. It could be confirmed that a differential operation was made as the relative speeds of the gears are varied depending on a change in angle ($\theta$).

On the basis of the operation of the differential gear unit 110, operations of the brake mechanism of the robot using the multi-output differential gear according to the first exemplary embodiment of the present invention will be described.

First, in a case in which the interior of a pipe has a straight form, since it can be assumed that no external resistance is present therein, the first output having a magnitude the same as that of driving force may be transferred from the first output gear 131 to the first moving units 171. In this case, since the second and third outputs may not be generated by the second output gear 141 and the third output gear 142, respectively, the second moving unit 172 and the third moving unit 173 may rotate at the same rotational speed as that of the first moving units 171.

Then, in a case in which the interior of a pipe has a curved form or includes obstacles present therein, external resistance may be applied from at least one of the first moving units 171, the second moving unit 172, and the third moving unit 173, and rotational speeds of the respective moving units 170 may be changed by the operation of the differential gear unit 110 as described above. A description thereof has been described in the operation of the differential gear unit 110, it will be omitted herein.

Hereinafter, a process of transferring driving force from the differential gear unit 110 to the moving units 170 will be explained.

At least one spur gear of the output transferring unit 111 may be engaged with each output gear 131, 141 or 142 included in the differential gear unit 110 and may receive the driving force from the output gear 131, 141 or 142. In this case, rotational speeds of the output gears 131, 141 and 142 may be different from those of the spur gears 112 corresponding thereto, which may be determined depending on the numbers of sawtooth portions of the output gears 131, 141 and 142 and the spur gears 112.

A description will be made on the basis of the first output gear 131 transferring the first output to the first moving units 171. The first output gear 131 may be engaged with the spur gear 112a of the output transferring unit 111, and the output transferring shift 113 may be provided on a central axis of the spur gear 112a.

That is, the spur gear 112a may be provided on the output transferring shift 113a, such that the spur gear 112a and the output transferring shift 113a may rotate together and transfer consequently formed rotational force to the bevel gear 114a provided on an end portion of the output transferring shift 113a.

Here, the bevel gear 114a may be engaged with the spur gear of the gear mechanism 1711 and finally, the driving force may be transferred to the wheel part 1713.

Since a process of applying external resistance to the wheel part 1713 may be performed in a direction reverse to that of a driving force transferring process, a detailed description thereof will be omitted herein.

In addition, such an operation may be performed in the second moving unit 172 and the third moving unit 173 in the same manner as that of the first moving units 173.

Meanwhile, when the robot using the multi-output differential gear according to the first exemplary embodiment of the present invention moves along the interior of a curved pipe, contact between the moving units 170 and an inside wall of the curved pipe may be maintained by the interval adjusting unit 180.

In more detail, when the robot using the multi-output differential gear moves along the interior of a curved pipe, since centrifugal force may act in a radial direction, the robot may be close to a radially-outward wall portion of the curved pipe but may be apart from a radially-inward wall portion thereof.

Here, since it is necessary to increase a spaced distance between the moving units 170 adjacent to the radially-outward wall portion, the interval adjusting unit 180 may allow the frame part 161 to move in a direction approaching the differential gear unit 110 to thereby increase the spaced distance between the moving units 170.

In addition, since it is necessary to decrease a spaced distance between the moving units 170 adjacent to the radially-inward wall portion, the interval adjusting unit 180 may allow the frame part 161 to move in a direction away from the differential gear unit 110 to thereby decrease the spaced distance between the moving units 170.

In this manner, the capability of maintaining contact properties between the moving units 170 and the inside wall of the pipe may be improved by properly adjusting the spaced distance between the moving units 170 according to a state of the pipe.

Then, a brake mechanism of a robot using a multi-output differential gear according to a second exemplary embodiment of the present invention will be explained.

Figure 14:
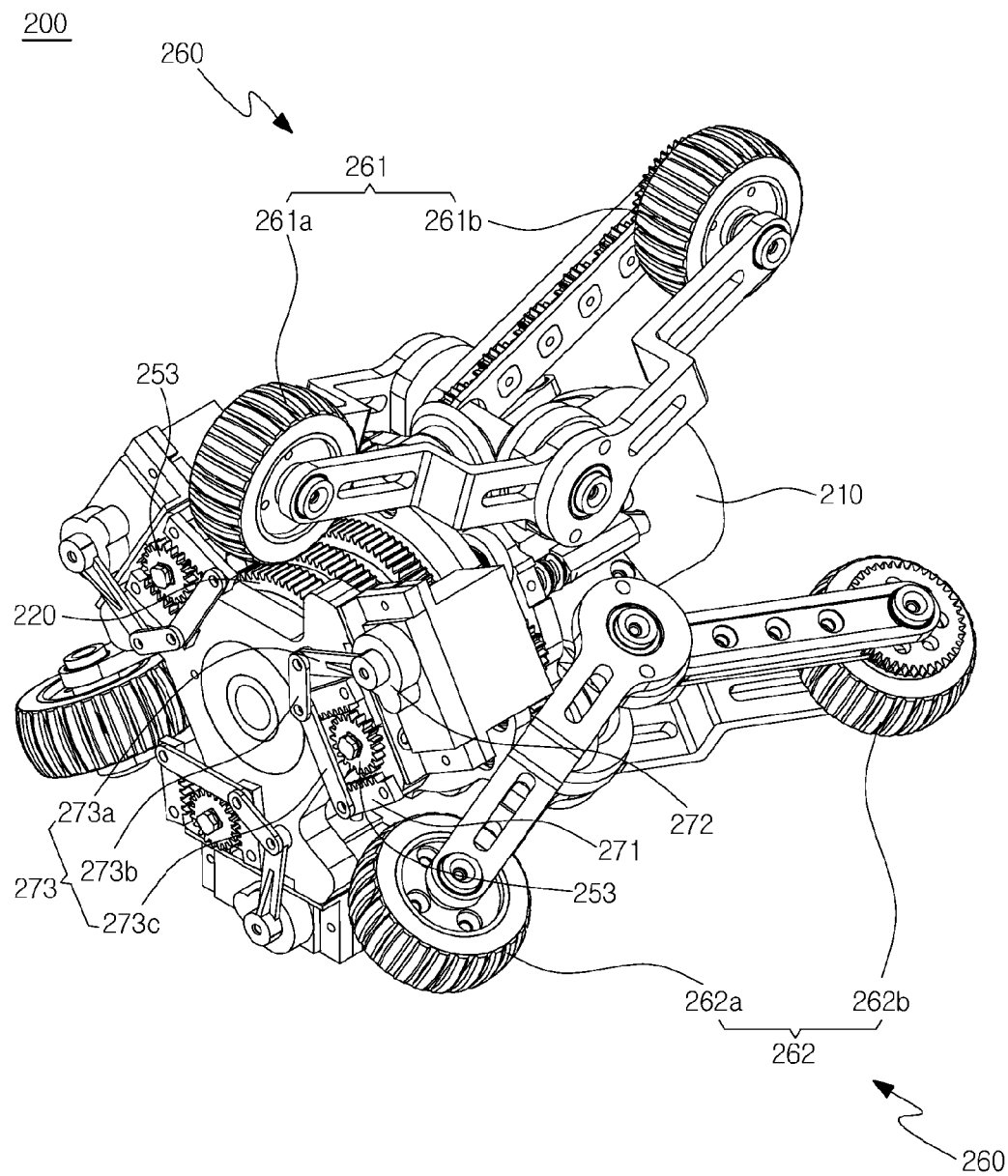
FIG. 14 is a perspective view schematically illustrating a brake mechanism of a robot using a multi-output differential gear according to a second exemplary embodiment of the present invention.
Figure 15A:
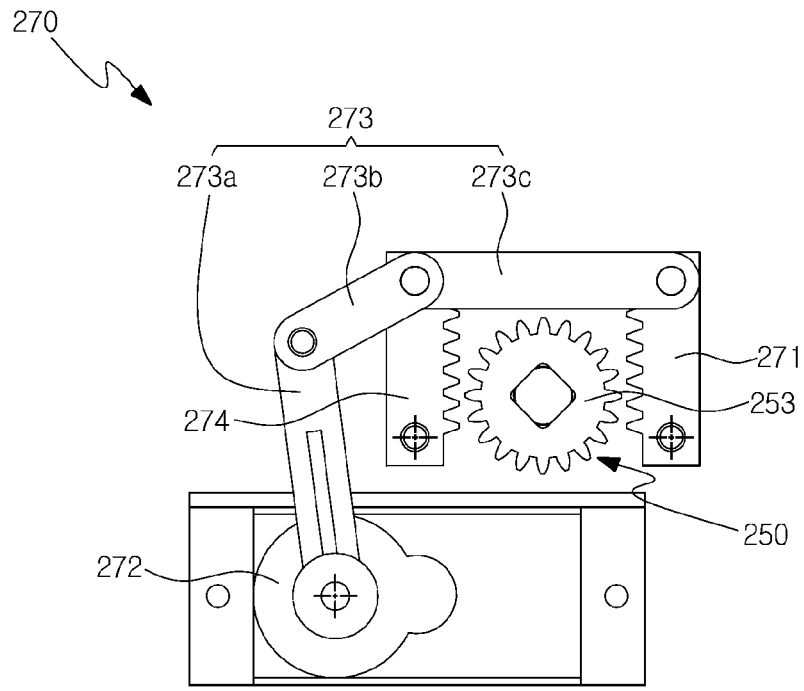
FIGS. 15A and 15B is a plan view schematically illustrating an operation of a braking unit in the brake mechanism of the robot using the multi-output differential gear illustrated in FIG. 14.
Figure 15B:
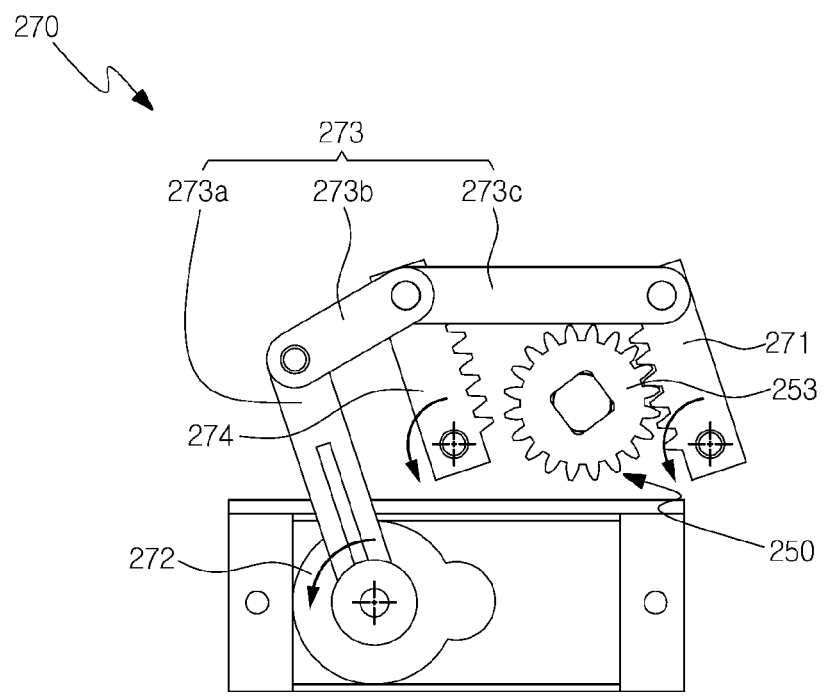

FIG. 14 is a perspective view schematically illustrating a brake mechanism of a robot using a multi-output differential gear according to a second exemplary embodiment of the present invention. FIG. 15 is a plan view schematically illustrating an operation of a braking unit in the brake mechanism of the robot using the multi-output differential gear illustrated in FIG. 14.

Referring to FIG. 14 or 15, a brake mechanism 200 of a robot using a multi-output differential gear according to a second exemplary embodiment of the present invention, may promptly block driving force transferred from a differential gear unit to moving units in a case in which the robot moving along an inside wall of a pipe to inspect an interior state of the pipe may malfunction and accordingly, the robot needs to be interrupted. The brake mechanism 200 of the robot using the multi-output differential gear according to the second exemplary embodiment of the present invention may include a driving unit 210, a differential gear unit 220, an output transferring unit 250, moving units 260, and a braking unit 270.

Referring to FIG. 15, the driving unit 210 may apply driving force to the differential gear unit 220 to be described later, and a method of applying force is not particularly limited.

That is, the driving unit 210 may be connected to the differential gear unit 220 to directly transfer driving force, and the driving force may be indirectly transferred via a connection element such as a belt portion, a chain portion and the like between the driving unit 210 and the differential gear unit 220.

In addition, in a similar manner to the foregoing first exemplary embodiment, the rescuing unit 160 may be mounted.

Since the differential gear unit 220 is identical to the differential gear unit 110 according to the first exemplary embodiment, a detailed description thereof will be omitted herein.

The output transferring unit 250 may be connected to a first output gear 231, a second output gear 241, and a third output gear 242 and may transfer outputs provided by the first output gear 231, the second output gear 241, and the third output gear 242 to a first moving unit 261, a second moving unit 262 and a third moving unit 263, respectively. The output transferring unit 250 may include a first output transferring unit 250a, a second output transferring unit 250b, and a third output transferring unit 250c, and each of the output transferring units 250a, 250b and 250c may include a transfer gear 251, an axial member 252 and a brake gear 253.

The first output transferring unit 250a may transfer an output from the first output gear 231 to the first moving unit

261 and at the same time, may transfer external resistance from the first moving unit 261 to the first output gear 231. The first output transferring unit 250a may include a first transfer gear 251a, a first axial member 252a and a first brake gear 253a.

Here, except for a difference in which the first output transferring unit 250a, the second output transferring unit 250b, and the third output transferring unit 250c are connected to the first output gear 231, the second output gear 241, and the third output gear 242, respectively, configurations of the first output transferring unit 250a, the second output transferring unit 250b, and the third output transferring unit 250c are identical to one another. Thus, only the first output transferring unit 250a may be representatively explained herein.

The first transfer gear 251a may be engaged with sawtooth portions formed on an outer circumferential surface of the first output gear 231. The first axial member 252a, an extension member extended along a central axis of the first transfer gear 251a, may have one end extended to be linked with the braking unit 270 and the other end extended to be linked with the moving units 260. The first brake gear 253a may be provided on one end of the first axial member 252a and be linked with the braking unit 270 to thereby forcibly block a first output provided by the first output gear 231.

That is, the first output gear 231 rotates and accordingly, the first transfer gear 251a may rotate, and such an output may be transferred to the first brake gear 253a and the first moving unit 261.

Meanwhile, a bevel gear 254 may be provided on the other end of the first axial member 252a in order to transfer the first output to the first moving unit 261.

The moving units 260 may be linked to the respective output gears 231, 241 and 242 and receive outputs from the output gears 231, 241 and 242 to perform movements thereof. Further, the moving units 260 may receive external resistance generated during the movements thereof and transfer the external resistance to the respective output gears. The moving units 260 may include the first moving unit 261, the second moving unit 262 and the third moving unit 263.

Here, except for a difference in which the first moving unit 261, the second moving unit 262 and the third moving unit 163 may be connected to the first output transferring unit 250a, the second output transferring unit 250b, and the third output transferring unit 250c, respectively, to receive the first output, the second output, and the third output, respectively, since configurations of the first moving unit 261, the second moving unit 262 and the third moving unit 263 are substantially identical to one another and are also substantially identical to those of the first moving units 170 according the first exemplary embodiment, a detailed description thereof will be omitted herein.

The braking unit 270 may be linked with the output transferring unit 250 and may forcibly block the output received from the differential gear unit 220 from being transferred to the moving units 260. The braking unit 270 may include a first locking member 271, a driving motor 272, a link part 273, and a second locking member 274.

The first locking member 271 may move in a direction approaching the brake gear 253 in a state in which it is spaced apart from the brake gear 253. Consequently, the first locking member 271 may come into contact with the brake gear 253 to stop the movement of the output transferring unit 250.

Here, sawtooth portions may be formed on a surface of the first locking member 271 facing the brake gear 253, the sawtooth portions being engaged with the brake gear 253.

That is, the sawtooth portions of the first locking member 271 may be engaged with the brake gear 253 to stop the brake gear 253 and at the same time, all of the transfer gear 251 and the axial member 252 connected to the brake gear 253 may be stopped and consequently, the transfer of an output to the moving units 260 may be interrupted.

The driving motor 272 may be provided to transfer electric power so as to move the first locking member 271 and may be a servo motor according to the second exemplary embodiment of the present disclosure. However, the present invention is not limited thereto.

The link part 273, a member connecting the first locking member 271 and the driving motor 272, may be provided as a three-fold link structure having one end thereof connected to the driving motor 272 and the other end thereof connected to the first locking member 271.

The second locking member 274, a member opposed to the first locking member 271 with the brake gear 253 interposed between the locking members, may contact the brake gear 253 to forcibly interrupt the rotation of the brake gear 253.

Here, the movements of the second locking member 274 and the first locking member 271 may be performed in opposite manners. That is, when the first locking member 271 approaches the brake gear 253, the second locking member 274 may be distant from the brake gear 253, while when the first locking member 271 is apart from the brake gear 253, the second locking member 274 may approach the brake gear 253.

Here, sawtooth portions may be formed on a surface of the second locking member 274 facing the brake gear 253, the sawtooth portions being engaged with the brake gear 253.

That is, when the sawtooth portions of the first locking member 271 or the sawtooth portions of the second locking member 274 are engaged with the brake gear 253, a sliding movement of the brake gear 253 may be unfeasible and the rotation thereof may be forcibly interrupted.

Here, contact between the brake gear 253 and the first locking member 271 or the second locking member 274 may be associated with a direction of the rotation of the brake gear 253.

Re-explaining coupling relationships of the braking unit 270 according to the second exemplary embodiment of the present invention, in a state in which the driving motor 272 and a first stage link 273a of the link part 273 are connected to each other, the driving motor 272 may be provided to move in a direction in which it pulls or pushes the link part 273.

Here, the first locking member 271 may have one end thereof connected to a third stage link 273c of the link part 273 and the other end thereof rotatably provided while a location thereof is in a fixed state, whereby the first locking member 271 may be adjacent to the brake gear 253 as the driving motor 272 pulls the link part 273.

In addition, the second locking member 274 may have one end thereof connected to a connection portion between a second stage link 273b and the third stage link 273c of the link part 273 and the other end thereof rotatably provided while a location thereof is in a fixed state, whereby the other end of the second locking member 274 may be distant from the brake gear 253 as the driving motor 272 pulls the link part 273.

In this manner, the movements of the first locking member 271 and the second locking member 274 may be simultaneously determined by a single operation of the driving motor 272, such that the rotation of the brake gear 253 may be efficiently interrupted.

Here, each of the output transferring units 250a, 250b and 250c (that is, the output transferring unit 250) may all include the brake gear 253 and the braking unit 270 corresponding to the brake gear 253.

Meanwhile, the brake mechanism 200 of the robot using the multi-output differential gear according to the second exemplary embodiment of the present invention may further include an interval adjusting unit (not shown) controlling the movements of the moving units 260 in order to improve the capability of maintaining contact between the moving units 260 and the inside wall surface of a pipe.

The interval adjusting unit (not shown) may be provided in substantially the same manner as that of the first exemplary embodiment.

That is, the moving units 260 may move in a direction approaching or away from a central axis 205 of the differential gear unit 220, whereby the contact between the moving units 260 and the inside wall surface of a pipe may be maintained.

Hereinafter, operations of the brake mechanism 200 of the robot using the multi-output differential gear as described above will be described.

First, at least one transfer gear 251 of the output transferring unit 250 may be engaged with each output gear 231, 241 or 242 included in the differential gear unit 220 and may receive the driving force from the output gear 231, 241 or 242. In this case, a rotational speed of the output gear 231, 241 or 242 may be different from that of the transfer gear 251 corresponding thereto, which may be determined depending on the numbers of sawtooth portions of the output gears 231, 241 and 242 and spur gears 212.

Explanation is made on the basis of the first output gear 231 transferring the first output to the first moving unit 261. The first output gear 231 may be engaged with the first transfer gear 251a of the first output transferring unit 250a, and the first axial member 252a may be disposed on the central axis of the first transfer gear 251a and rotate together with the first transfer gear 251a.

That is, the first transfer gear 251a may be provided on the first axial member 252a, such that the first transfer gear 251a and the first axial member 252a rotate together, and accordingly formed rotational force may be transferred to a bevel gear 254a provided on an end portion of the first axial member 252a.

Here, the bevel gear 254a may be engaged with the spur gear of a gear mechanism 2611 and finally, the driving force may be transferred to a wheel part 2613.

Since a process of applying external resistance to the wheel part 2613 may be performed in a direction reverse to that of the driving force transferring process, a detailed description thereof will be omitted herein.

In addition, such an operation may be performed in the second moving unit 262 and the third moving unit 263 in the same manner as that of the first moving unit 261.

Meanwhile, in the case that the movement of at least one of the moving units 260 is restricted by obstacles, the braking unit 270 may be operated in order to interrupt the driving force transferred from the differential gear unit 220 to the moving units 260.

Since the first brake gear 253a may be provided on the other end of the first axial member 252a connected to the first transfer gear 251a, the first transfer gear 251a and the first brake gear 253a may rotate together.

That is, in the case that the first transfer gear 251a may rotate by receiving the first output from the first output gear 231, the first brake gear 253a may also rotate, and in the case that the rotation of the first brake gear 253a is interrupted by the braking unit 270, the rotation of the first transfer gear 251a may also be interrupted.

That is, when the rotation of the first brake gear 253a is interrupted by the braking unit 270, the rotation of the bevel gear 254a may be interrupted and consequently, the transfer of the first output to the first moving member 261 may be blocked.

Such an operation of the braking unit 270 may be initiated by the driving motor 272. The driving motor 272 may move in a state of being connected to the link part 273 and thus, pull the link part 273. Since the link part 273 may be connected to both the first locking member 271 and the second locking member 274, both of the first locking member 271 and the second locking member 274 may be driven through the movement of the link part 273.

That is, when the driving motor 272 pulls the link part 273, the sawtooth portions formed on the first locking member 271 and the second locking member 274 may be simultaneously engaged with the first brake gear 253a to thereby interrupt the rotation of the first brake gear 253a.

Then, a brake mechanism of a robot using a multi-output differential gear according to a third exemplary embodiment of the present invention will be explained.

A brake mechanism 300 of a robot using a multi-output differential gear according to the third exemplary embodiment of the present invention may include a differential gear unit 310, a driving unit 350, a rescuing unit 360, moving units (not shown), and an interval adjusting unit (not shown), and may be configured in such a manner that respective output gears of the differential gear unit 310 are linked with each other to control speeds thereof according to an internal state of a pipe, thereby allowing for stable driving of the robot and if necessary, driving force applied to the differential gear unit 310 may be blocked.

Figure 16:
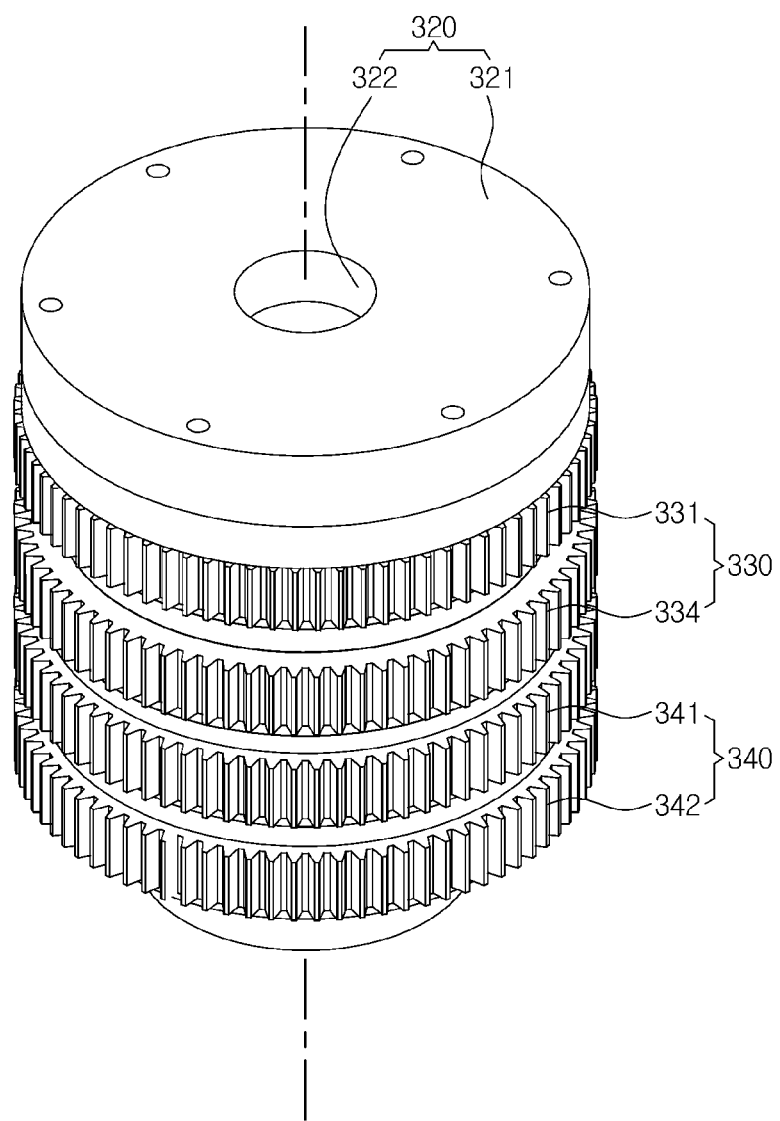
FIG. 16 is a perspective view schematically illustrating a differential gear unit in a brake mechanism of a robot using a multi-output differential gear according to a third exemplary embodiment of the present invention.
Figure 17:
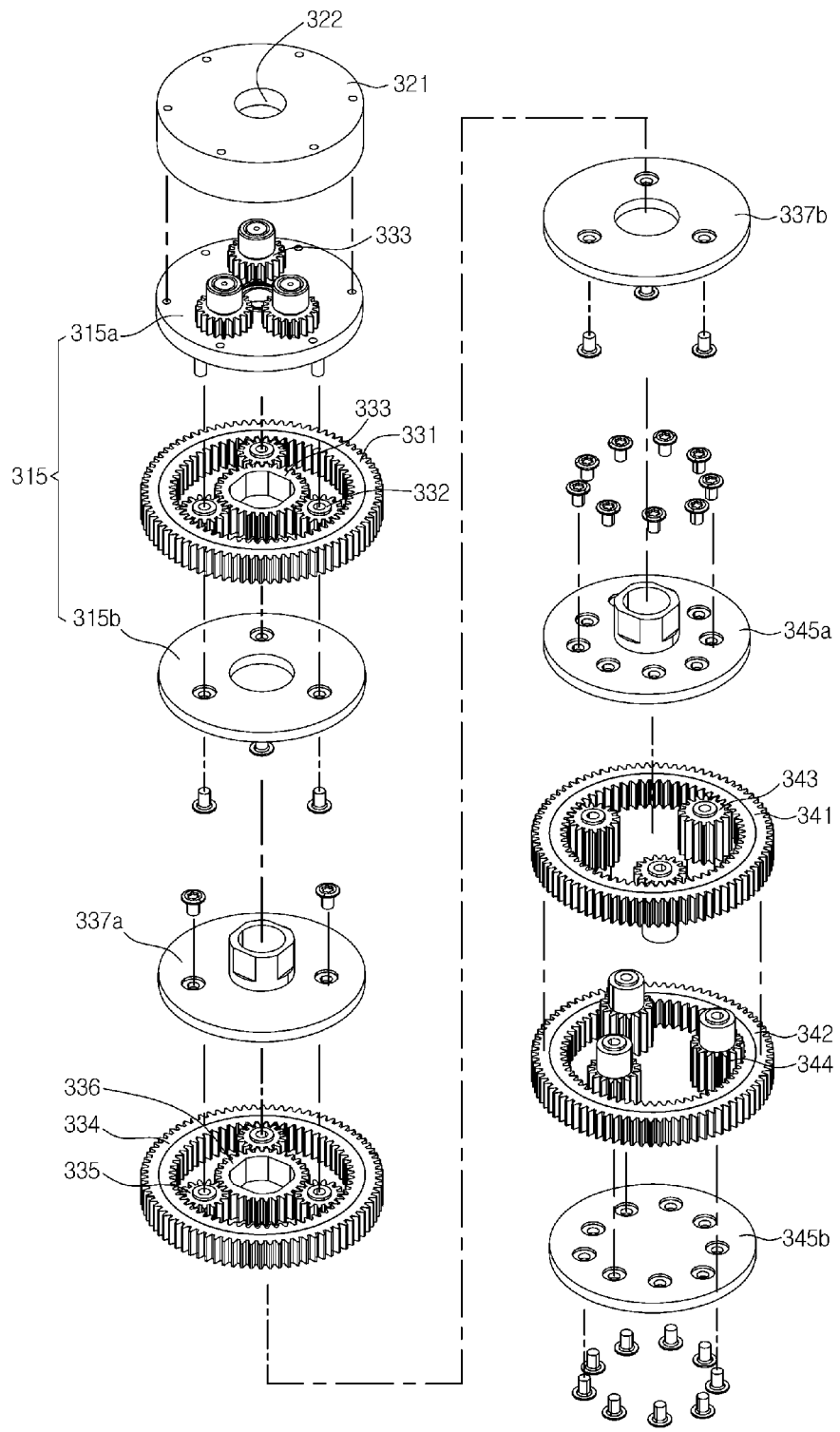
FIG. 17 is an exploded perspective view schematically illustrating the differential gear unit in the brake mechanism of the robot using the multi-output differential gear illustrated in FIG. 16.

FIG. 16 is a perspective view schematically illustrating a differential gear unit in a brake mechanism of a robot using a multi-output differential gear according to a third exemplary embodiment of the present invention. FIG. 17 is an exploded perspective view schematically illustrating the differential gear unit in the brake mechanism of the robot using the multi-output differential gear illustrated in FIG. 16.

Referring to FIG. 16 or 17, the differential gear unit 310 may generate a plurality of differential outputs by driving force solely provided. The differential gear unit 310 may include a driving-force transferring part 320, a first differential gear part 330, and a second differential gear part 340. Since the driving-force transferring part 320 and the second differential gear part 340 are identical to those of the first exemplary embodiment 100, a detailed description thereof will be omitted.

The first differential gear part 330 may include a first output gear 331, three first epicyclic gears 332, a first intermediate gear 333, a fourth output gear 334, three fourth epicyclic gears 335, a second intermediate gear 336.

In addition, third finishing members 337a and 337b may be provided between the first intermediate gear 333 and the fourth epicyclic gears 335 to transfer a first intermediate output from the first intermediate gear 333 to the fourth epicyclic gears 335 and may fix locations of the fourth output gear 334, the three fourth epicyclic gears 335, the second intermediate gear 336. However, the present invention is not limited thereto.

Disposition relationships of the first differential gear part 330 will be explained. The first differential gear part 130 according to the first exemplary embodiment 100 may be provided as at least two or more first differential gear parts 330 in the third exemplary embodiment of the present invention, and the at least two or more first differential gear parts 330 may be disposed to be adjacent to each other in a direction of the rotational axis 151.

The moving units (not shown) may be linked with the first output gear 331, the second output gear 341, the third output gear 342, and the fourth output gear 334, may move by receiving the outputs from the respective output gears, and may transfer external resistance to the respective output gears by receiving the external resistance generated during the movements of the moving units 260.

According to the third exemplary embodiment 300 of the present invention, four moving units (not shown) may be provided and disposed such that angles formed by the respective moving units (not shown) centered on a rotational axis 351 of the driving unit 350 may be 90°, equal angles, but the present invention is not limited thereto.

Meanwhile, except for the disposition relationships of the respective moving units, since the moving units are the equivalent of the moving units 160 according to the foregoing first exemplary embodiment 100, a detailed description thereof will be omitted.

The interval adjusting unit (not shown) may be provided as four pairs of connection members (not shown) so as to be connected to the respective moving units, and since other configurations thereof are identical to those of the first exemplary embodiment 100, and accordingly, a detailed description thereof will be omitted herein.

That is, according to the third exemplary embodiment 300, since four output gears may be included in the differential gear unit 310, fourth moving units (not shown) and four connection members (not shown) of the interval adjusting unit (not shown) may be provided to correspond to the four output gears.

Since the differential gear unit 310 may include three output gears, more epicyclic gears and intermediate gears may be further provided to correspond to the output gears, and in addition, more moving units and connection members of the interval adjusting unit may be further provided.

Hereinafter, operations of the brake mechanism 300 of the robot using the multi-output differential gear according to the third exemplary embodiment of the present invention as described above will be described.

In the configuration of the differential gear unit 310, operating methods of the driving-force transferring part 320 and the second differential gear part 340 are identical to those of the first exemplary embodiment 100. In terms of a rescuing unit (not shown), the moving units (not shown), and the interval adjusting unit (not shown), the amounts of the components are merely increased and operating methods thereof are identical to those of the first exemplary embodiment.

Operations of the first differential gear part 330 will be explained. The driving force transferred from the driving-force transferring part 320 to the first intermediate gear 333 and a process of generating the first intermediate output may be identical to those of the first exemplary embodiment 100.

First, when the first intermediate output is generated by the first intermediate gear 323, the first intermediate output may be transferred to the fourth epicyclic gears 335 linked with the first intermediate gear 323 via a second intermediate output transferring part 337. The first intermediate output transferred to the fourth epicyclic gears 335 may be converted into a second intermediate output by the second intermediate gear 336 depending on whether or not external resistance is applied from the fourth output gear 334 since the fourth epicyclic gears 335 are linked with the fourth output gear 334 and the second intermediate gear 336.

In the case that the second intermediate output is generated from the second intermediate gear 336 due to the external resistance being applied to the fourth output gear 334, the second intermediate output may be transferred to the second differential gear part 340 to operate the second differential gear part 340. Since a subsequent operation of the second differential gear part 340 is identical to that of the first exemplary embodiment 100, a detailed description will be omitted.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

According to exemplary embodiments of the present invention as described above, a brake mechanism of a robot using a multi-output differential gear, capable of promptly blocking driving force transferred to moving units in a case in which the robot may malfunction may be provided.

In addition, in the brake mechanism of the robot using the multi-output differential gear, a differential operation may be automatically performed at the time of applying external resistance to provide an appropriate level of driving force to the respective moving units, whereby the robot may be stably driven.

Further, the capability of maintaining contact between the inside wall of a pipe and the robot may be improved, whereby the robot may be efficiently moved in the interior of the pipe.

What is claimed is:

1. A clutch mechanism, comprising:
    a differential gear unit receiving driving force and generating at least three outputs differentiated from the driving force while being linked with the driving force;
    a driving unit transferring the driving force to the differential gear unit and moving in a direction away from or approaching the differential gear unit to thereby be detachably provided in the differential gear unit; and
    a rescuing unit controlling a spaced distance between the driving unit and the differential gear unit to attach and detach the driving unit to and from the differential gear unit.

2. The clutch mechanism of claim 1, wherein the differential gear unit includes: a driving transferring part rotating by receiving the driving force from the driving unit;
    a first differential gear part disposed on one surface of the driving transferring part and including a first output gear generating a first output having a rotational speed different from that of the driving transferring part when external resistance is applied to the first output gear and an intermediate gear linked with the first output gear to generate an intermediate output; and
    a second differential gear part receiving the intermediate output from the first differential gear part and including a second output gear generating a second output having a rotational speed different from that of the intermediate output when external resistance is applied to the second output gear and a third output gear linked with the second output gear and generating a third output having a rotational speed different from that of the second output.

3. The clutch mechanism of claim 2, wherein the driving unit has a sliding gear on a rotational axis thereof, and
the driving transferring part includes a plurality of connection gears arranged on a virtual circle centered on the rotational axis, the sliding gear being detachably provided between the connection gears according to movements of the driving unit.

4. The clutch mechanism of claim 3, wherein the rescuing unit includes:
a frame part extended from an outer surface of the driving unit in a radial direction of the rotational axis; and
an axial member passing through the frame part and connected to the sliding gear,
wherein a spaced distance between the driving transferring part and the driving unit is controlled by applying a load to the axial member.

5. The clutch mechanism of claim 4, wherein the rescuing unit further includes: a handle part provided on an end portion of the axial member adjacent to the frame part and preventing the axial member from being separated from the frame part during the applying of the load to the axial member.

6. The clutch mechanism of claim 4, wherein the rescuing unit further includes: an elastic member provided on an end portion of the axial member adjacent to the sliding gear and applying elastic force to the axial member.

7. The clutch mechanism of claim 2, further comprising: a plurality of moving units respectively linked with the outputs generated by the first output gear, the second output gear, and the third output gear, receiving external resistance, and transferring the external resistance to at least one of the first output gear, the second output gear and the third output gear.

8. The clutch mechanism of claim 7, further comprising: an interval adjusting unit controlling a spaced distance between the moving units and the differential gear unit so as to maintain a state of contact between the moving units and a movement surface.

9. The clutch mechanism of claim 8, wherein the interval adjusting unit includes:
a sliding element disposed on an outer surface of the driving unit and movably provided in a length direction of the driving unit;
a first connection member extended from the sliding element and connected to one of the pair of moving units; and
a second connection member extended from the sliding element and connected to the other of the pair of moving units,
the first connection member and the second connection member allowing the pair of moving units to move in a direction approaching or away from each other according to the movement of the sliding element.

10. The clutch mechanism of claim 2, wherein the first differential gear part includes:
a plurality of output gears generating a plurality of outputs respectively having a rotational speed different from that of the driving force provided from the driving transferring part when external resistance is applied.

11. A brake mechanism, comprising:
a driving unit;
a differential gear unit receiving driving force and generating at least three outputs differentiated from the driving force while being linked with the driving force when external resistance is applied;
an output transferring unit connected to the differential gear unit and linked with the respective outputs generated by the differential gear unit; and
a braking unit provided in a state of contact or non-contact with one end of the output transferring unit to interrupt or allow for the movement of the output transferring unit.

12. The brake mechanism of claim 11, wherein the differential gear unit includes:
a driving transferring part rotating by receiving the driving force from the driving unit;
a first differential gear part disposed on one surface of the driving transferring part and including a first output gear generating a first output having a rotational speed different from that of the driving transferring part when external resistance is applied to the first output gear and an intermediate gear linked with the first output gear to generate an intermediate output; and
a second differential gear part receiving the intermediate output from the first differential gear part and including a second output gear generating a second output having a rotational speed different from that of the intermediate output when external resistance is applied to the second output gear and a third output gear linked with the second output gear and generating a third output having a rotational speed different from that of the second output.

13. The brake mechanism of claim 12, wherein sawtooth portions are formed on an outer circumferential surface of the first output gear,
the output transferring unit includes a first output transferring part including a first transfer gear engaged with the first output gear, a first axial member extended from the first transfer gear in a direction of a central axis of the first transfer gear, and a first brake gear provided on the first axial member and linked with the braking unit, and
the braking unit includes a first locking member movably provided in a direction approaching or away from the one end of the output transferring unit to selectively contact the one end of the output transferring unit; a driving motor allowing for movements of the first locking member; and a link part connecting the first locking member and the driving motor to each other.

14. The brake mechanism of claim 13, wherein sawtooth portions are formed on a surface of the first locking member opposed to the first brake gear, the sawtooth portions being engaged with the first brake gear.

15. The brake mechanism of claim 14, wherein the braking unit further includes:
a second locking member opposed to the first locking member with the first brake gear interposed between the locking members, and having sawtooth portions formed on a surface thereof opposed to the first locking member, the second locking member approaching or being apart from the first locking member while being linked with the movement of the first locking member.

16. The brake mechanism of claim 12, wherein the first differential gear part further includes:
a plurality of output gears generating a plurality of outputs respectively having a rotational speed different from that of the driving force when external resistance is applied.

* * * * *